US008792892B2

(12) United States Patent
Wu

(10) Patent No.: US 8,792,892 B2
(45) Date of Patent: Jul. 29, 2014

(54) HANDOVER CONTROL METHOD, APPARATUS AND SYSTEM

(75) Inventor: Wenfu Wu, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 5 days.

(21) Appl. No.: 13/279,744

(22) Filed: Oct. 24, 2011

(65) Prior Publication Data

US 2012/0094674 A1    Apr. 19, 2012

Related U.S. Application Data

(63) Continuation of application No. PCT/CN2010/072086, filed on Apr. 22, 2010.

(30) Foreign Application Priority Data

Apr. 22, 2009  (CN) .......................... 2009 1 0106765
May 12, 2009  (CN) .......................... 2009 1 0141041

(51) Int. Cl.
*H04W 36/00*  (2009.01)

(52) U.S. Cl.
USPC ........... 455/437; 455/434; 455/435; 455/436; 370/331; 370/332; 370/333; 370/334

(58) Field of Classification Search
USPC ........................ 455/434–444; 370/331–338
See application file for complete search history.

(56) References Cited

U.S. PATENT DOCUMENTS

| 8,027,687 B2* | 9/2011 | Jung et al. ..................... 455/450 |
| 2009/0047960 A1 | 2/2009 | Gunnarsson et al. |
| 2009/0070694 A1* | 3/2009 | Ore et al. ....................... 715/764 |
| 2009/0094351 A1* | 4/2009 | Gupta et al. .................. 709/220 |
| 2009/0094680 A1* | 4/2009 | Gupta et al. ...................... 726/3 |
| 2009/0158442 A1 | 6/2009 | Zhang |
| 2009/0258631 A1* | 10/2009 | Forsberg et al. .............. 455/411 |
| 2010/0240366 A1* | 9/2010 | Bi et al. ..................... 455/435.1 |

FOREIGN PATENT DOCUMENTS

| CN | 101365231 A | 2/2009 |
| CN | 101400075 A | 4/2009 |
| CN | 101600157 A | 12/2009 |
| CN | 101730267 A | 6/2010 |
| CN | 101742582 A | 6/2010 |
| WO | WO 2009/021246 A1 | 2/2009 |
| WO | 2010051504 A1 | 5/2010 |
| WO | WO 2010/121558 A1 | 10/2010 |

OTHER PUBLICATIONS

Access control for HeNB, Ericsson, 3GPP TSG-RAN WG3 #63-bis.*

(Continued)

*Primary Examiner* — Sharad Rampuria
*Assistant Examiner* — Sayed T Zewari
(74) *Attorney, Agent, or Firm* — Staas & Halsey LLP

(57) ABSTRACT

A handover control method is disclosed, including: obtaining an access mode and a closed subscriber group (CSG) identifier (ID) of a target area; deciding whether to allow an UE to be handed over to the target area according to the access mode and/or whether the CSG ID of the target area is included in the allowed CSG list of the UE. The handover control method can ensure the handover of the UE to the target area that the UE is allowed to access, therefore ensuring service continuity of the UE. A handover control apparatus and a handover control system are also disclosed.

13 Claims, 14 Drawing Sheets

(56) References Cited

OTHER PUBLICATIONS

Office Action, dated Nov. 5, 2012, in corresponding Chinese Application No. 200910141041.1 (19 pp.).
Office Action, dated Apr. 10, 2013, in corresponding Russian Application No. 2011147231 (9 pp.).
Office action issued in corresponding Japanese application No. 2012-506326,dated Feb. 19, 2013,and an English translation thereof,total 8 pages.
3GPP TSG-RAN WG3 #63-bis R3-090828,"Access control for HeNB",Ericsson,Mar. 23-26, 2009,total 2 pages.
3GPP TSG-RAN WG3 Meeting #63bis R3-090858,"Inbound mobility for HeNB",Samsung,Mar. 23-26, 2009,total 2 pages.
Third office action issued in corresponding Chinese application No. 200910141041.1,dated Feb. 17, 2013,and an English translation thereof,total 18 pages.
Office action issued in corresponding Russian application No. 2011147231/07,dated Jan. 24, 2013,and an English translation thereof,total 10 pages.
3GPP TSG RAN WG2 #65bis R2-092122,Requirements for Hybrid Access Mode and RAN2 Impacts,Vodafone,Mar. 23-Mar. 27, 2009,total 4 pages.
Communication pursuant to Article 94(3) EPC, dated May 31, 2013, in corresponding European Application No. 10766648.9.
Russian Notice of Allowance dated Dec. 3, 2013 in corresponding Russian Patent Application No. 2011147231/07 (9 pages) (6 pages English Translation).

"$3^{rd}$ Generation Partnership Project; Technical Specification Group Services and System Aspects; General Packet Radio Service (GPRS) enhancements for Evolved Universal Terrestrial Radio Access Network (E-UTRAN) access (Release 9)," 3GPP TS 23.401 V9.0.0 (Mar. 2009) Technical Specification (225 pages).
English Translation of the Written Opinion of the International Searching Authority of International Application No. PCT/CN2010/072086, mailing date of Jul. 29, 2010 (7 pages).
"$3^{rd}$ Generation Partnership Project; Technical Specification for Group Services and System Aspects; Service requirements for Home NodeBs and Home eNodeBs (Release 9)," 3GPP TS 22.220 V9.0.0 (Mar. 2009) Technical Specification (22 pages).
Huawei, "Discussion of Inbound Handover," 3GPP, R3-090932, Korea, Mar. 23-26, 2009.
Samsung, "Hybrid cell and PCI-split," 3GPP R2-09xxxx, Mar. 23-27, Seoul, South-Korea.
Ericsson, "Active mode inbound mobility to CSG," 3GPP R2-092084 Seoul, South Korea, Mar. 23-27, 2009.
3rd Generation Partnership Project, "Architecture aspects of Home NodeS and Home eNodeB," Technical Specification Group Services and System Aspects 3GPP TR 23.830 VO.3.1 (Mar. 2009).
Extended European Search Report dated (mailed) Dec. 19, 2011, issued in related Application No. 10766648.9-2414 PCT/CN2010072086, Hauwei Technologies Co., Ltd.

* cited by examiner

HANDOVER CONTROL METHOD, APPARATUS AND SYSTEM

CROSS-REFERENCE TO RELATED APPLICATIONS

This application is a continuation of International Application No. PCT/CN2010/072086, filed on Apr. 22, 2010, which claims priority to Chinese Patent Application No. 200910106765.2, filed on Apr. 22, 2009 and Chinese Patent Application No. 200910141041.1, filed on May 12, 2009, all of which are hereby incorporated by reference in their entireties.

FIELD OF THE INVENTION

The present invention relates to communications network technologies, and in particular, to a handover control method, apparatus and system.

BACKGROUND OF THE INVENTION

With the fast development of network technologies, an Internet access technology is improved continuously. A home access mode is a new access mode being developed by the 3rd Generation Partnership Project (3GPP) and non-3GPP standard organizations.

The home access mode connects a user equipment (UE) to a mobile network through a universal Internet Protocol (IP) access network by using a home wireless access point (WAP) and an allowed spectrum. The allowed spectrum includes spectrums in various networks, for example, the spectrums used in a UMTS terrestrial radio access network (UMTS Terrestrial Radio Access Network, UTRAN), an evolved UMTS terrestrial radio access network (E-UTRAN), a code division multiple access (CDMA) network, a worldwide interoperability for microwave access (WiMAX) network, a wireless local area network (WLAN), and a high rate packet data (HRPD) network. The home WAP is also known as a femtocell.

To restrict access to a specific home WAP by a UE, a closed subscriber group (CSG) mechanism is introduced. The CSG identifies some UEs (or subscribers, users or subscribers). These UEs are allowed to access one or several cells of an operator, but the access to these cells by other UEs is restricted. One CSG area includes one or several cells, and is identified by a CSG identifier (ID). One CSG area can be accessed by only one group of UEs, and the access by other UEs is restricted. An allowed CSG list, also known as a CSG white list, is a list of CSG IDs of all the CSG areas that a UE is allowed to access. When the UE is handed over from a source access network element (NE) to a target area, the UE decides whether to hand over by determining whether the CSG ID of the target area is included in the allowed CSG list of the UE. If the CSG ID of the target area is included in the allowed CSG list of the UE, the UE is allowed to be handed over to the target area; if the CSG ID of the target area is not included in the allowed CSG list of the UE, the UE is not allowed to be handed over to the target area.

Evidently, in a handover process under the current CSG mechanism, the source access network decides to initiate handover to the target area when signals are weak, and refuses the UE for being handed over to the target area when determining that the CSG ID of the target area is not included in the allowed CSG list of the UE. If the access mode of the target area is a Hybrid Access Mode, however, the UE is allowed to hand over to the target area. In this case, an ongoing service of the UE is terminated and service experience of the user is affected.

SUMMARY OF THE INVENTION

To solve the problem that the handover decision process under the current CSG mechanism affects user experience, embodiments of the present invention provide a handover control method and further provide a handover control apparatus and system.

To achieve the above objective, the present invention provides the following technical solutions:

A handover control method includes:
obtaining an access mode and a CSG ID of a target area; and
if the access mode of the target area is a Hybrid Access Mode, allowing a UE to hand over to the target area; or
if the access mode of the target area is a Closed Access Mode, determining whether the CSG ID of the target area is included in an allowed CSG list of the UE, and if the CSG ID of the target area is included in the allowed CSG list of the UE, allowing the UE to hand over to the target area; or
if the CSG ID of the target area is not included in the allowed CSG list of the UE, determining the access mode of the target area, and if the access mode of the target area is the Hybrid Access Mode, allowing the UE to hand over to the target area; or
if the allowed CSG list of the UE does not exist, determining the access mode of the target area, and if the access mode of the target area is the Hybrid Access Mode, allowing the UE to hand over to the target area.

A handover control apparatus includes an obtaining unit, configured to obtain an access mode and a CSG ID of a target area; and a handover control unit. If the access mode of the target area is a Hybrid Access Mode; or if the access mode of the target area is a Closed Access Mode, determine whether the CSG ID of the target area exists an allowed CSG list of the UE, and if the CSG ID of the target area is included in the allowed CSG list of the UE; or if the CSG ID of the target area is not included in the allowed CSG list of the UE, determine the access mode of the target area, and if the access mode of the target area is the Hybrid Access Mode; or if the allowed CSG list of the UE does not exist, determine the access mode of the target area, and if the access mode of the target area is the Hybrid Access Mode, the handover control unit allows the UE to be handed over to the target area.

A handover control system includes an information storing unit and a handover control apparatus. The handover control apparatus includes an obtaining unit, configured to obtain an access mode and a CSG ID of a target area from the information storing unit; and a handover control unit. If the access mode of the target area is a Hybrid Access Mode; or if the access mode of the target area is a Closed Access Mode, determine whether the CSG ID of the target area is included in an allowed CSG list of the UE, and if the CSG ID of the target area is included in the allowed CSG list of the UE; or if the CSG ID of the target area is not included in the allowed CSG list of the UE, determine the access mode of the target area, and if the access mode of the target area is the Hybrid Access Mode; or if the allowed CSG list of the UE does not exist, determine the access mode of the target area, and if the access mode of the target area is the Hybrid Access Mode, the handover control unit allows the UE to hand over to the target area.

The handover control method, apparatus and system provided in embodiments of the present invention use the access mode of the target area as a factor for consideration in handover control, provide a processing mechanism to perform handover according to the access mode of the target area under the CSG mechanism, and ensure the handover of the UE to the target area that the UE is allowed to access, therefore ensuring service continuity of the UE and enhancing the user experience.

DETAILED DESCRIPTION OF THE EMBODIMENTS

To help those skilled in the art better understand the present invention, the following describes the present invention in detail with reference to the embodiments and accompanying drawings. It is understandable that the embodiments described herein are provided only for explaining the objective of the present invention and not intended to limit the present invention.

Figure 1:
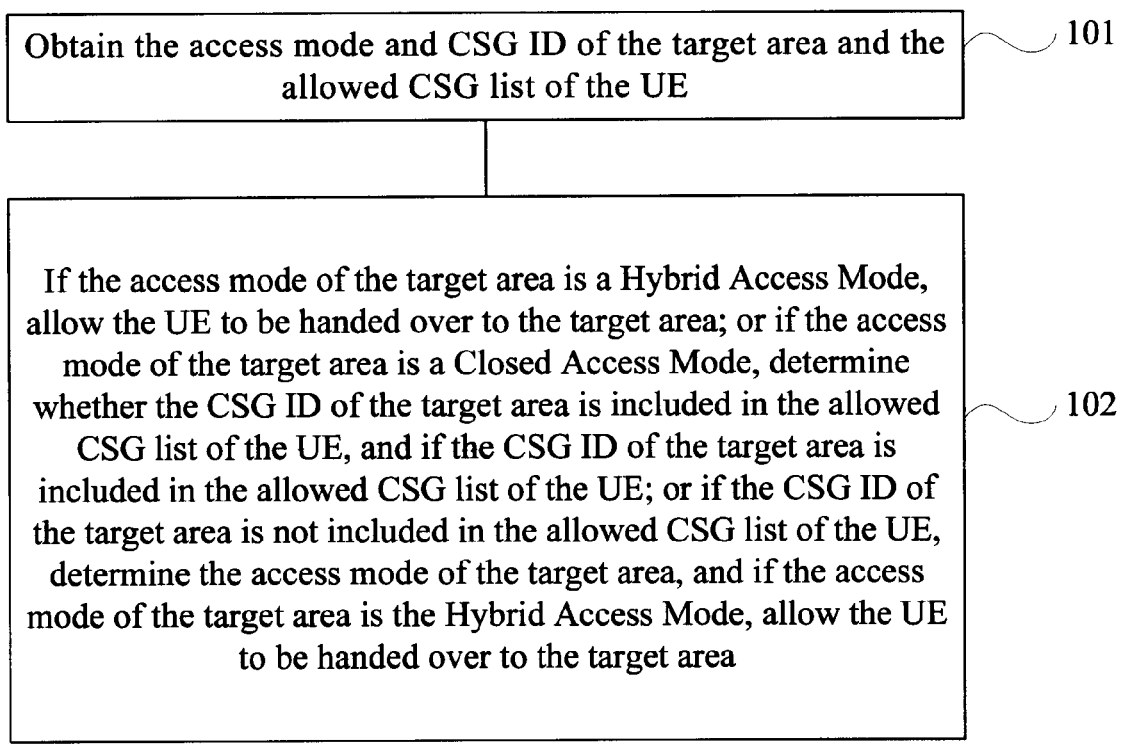
FIG. 1 is a flowchart of a handover control method according to a first embodiment of the present invention.

As shown in FIG. 1, a handover control method provided in a first embodiment includes the following steps:

Step 101: Obtain an access mode and a CSG ID of a target area and an allowed CSG list of a UE.

Step 102: If the access mode of the target area is a Hybrid Access Mode; or if the access mode of the target area is a Closed Access Mode, determine whether the CSG ID of the target area is included in the allowed CSG list of the UE; if the CSG ID of the target area is included in the allowed CSG list of the UE; or if the CSG ID of the target area is not included in the allowed CSG list of the UE, determine the access mode of the target area; if the access mode of the target area is the Hybrid Access Mode, allow the UE to be handed over to the target area.

Note: When the allowed CSG list of the UE (also known as CSG subscription information in the present invention) cannot be obtained in step 101, step 102 further determines the access mode of the target area, and allows the UE to be handed over to the target area if the access mode of the target area is the Hybrid Access Mode.

In the present invention, to determine whether the CSG ID of the target area is included in the allowed CSG list of the UE is to know whether the CSG ID of the target area is included in the allowed CSG list of the UE.

The handover control method provided in the first embodiment of the present invention uses the access mode of the target area as a factor for consideration in handover control, provides a processing mechanism to perform handover according to the access mode of the target area under a CSG mechanism, and ensures the handover of the UE to the target area that the UE is allowed to access, therefore ensuring service continuity of the UE and enhancing user experience.

The target area described in this embodiment includes an area such as a target access NE, a target cell, or a target tracking area. The access NE may be a home WAP, for example, a home NodeB (HNB), a home evolved NodeB (HeNB), a home non-3GPP WAP, a WAP with the CSG function, an HNB gateway (GW), an HeNB GW, or a home non-3GPP WAP GW.

The handover in this embodiment is the handover of the UE from the source area to the target area. The handover may be performed in a same location area or between different location areas, and may further include a scenario that the UE accesses a new cell when initiating a location update procedure.

Figure 2:
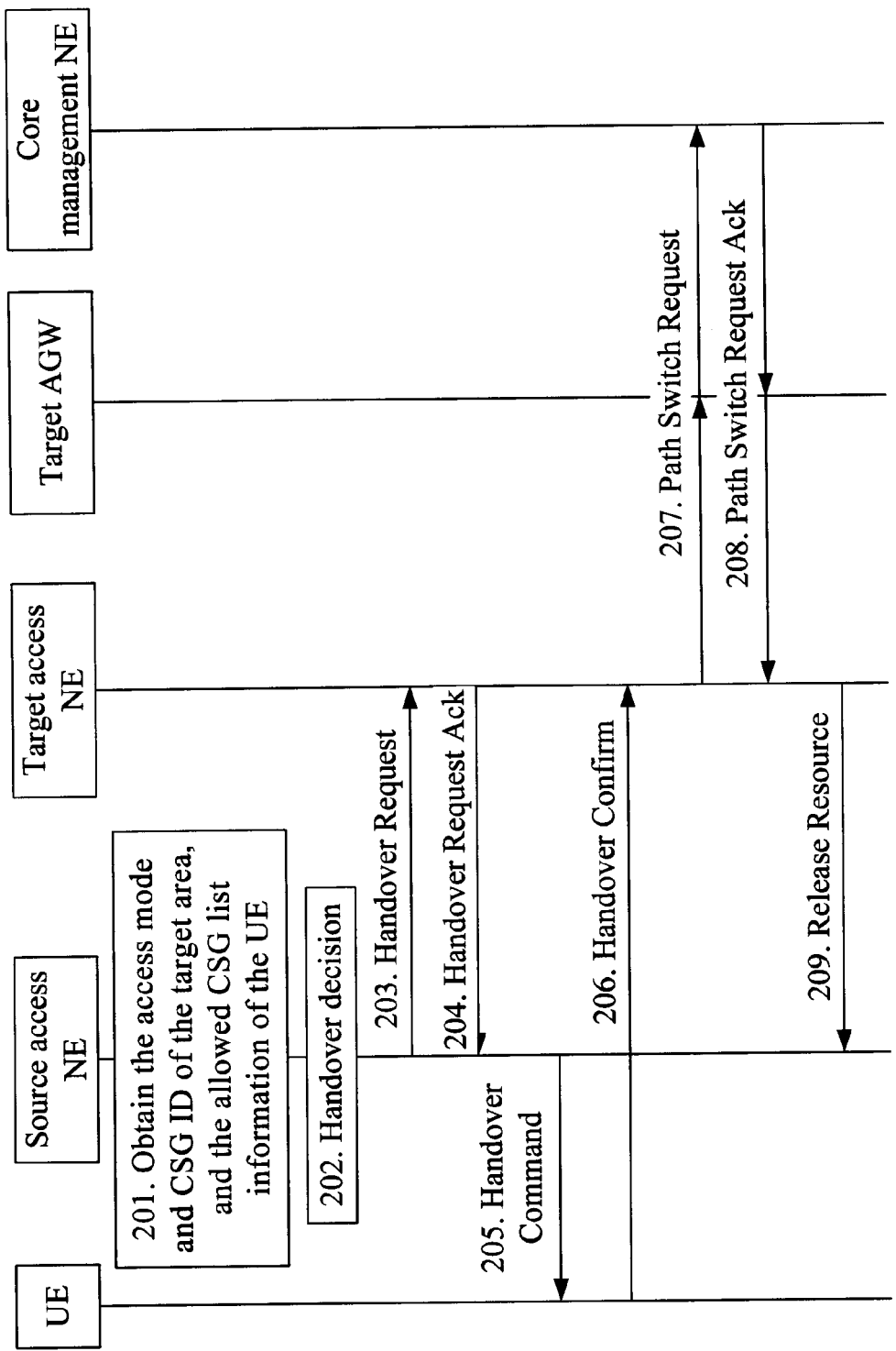
FIG. 2 is a signaling flowchart of a handover control method in way 1 according to a second embodiment of the present invention.

The following describes the handover control method provided in a second embodiment of the present invention. In the handover control method of the second embodiment, the source access NE implements handover control during a handover. According to different network topologies and handover procedures, the second embodiment includes two ways:

Way 1: This way deals with an X2-based handover, where X2 represents an X2 interface. The source access NE and the target access NE can transmit a message to each other, and the core management NE remains unchanged, that is, the source core management NE and the target core management NE are a same core management NE. As shown in FIG. 2, the flowchart of this way includes the following steps:

Step 201: The source access NE obtains the access mode and CSG ID of the target area, and the allowed CSG list information of the UE.

Figure 3:
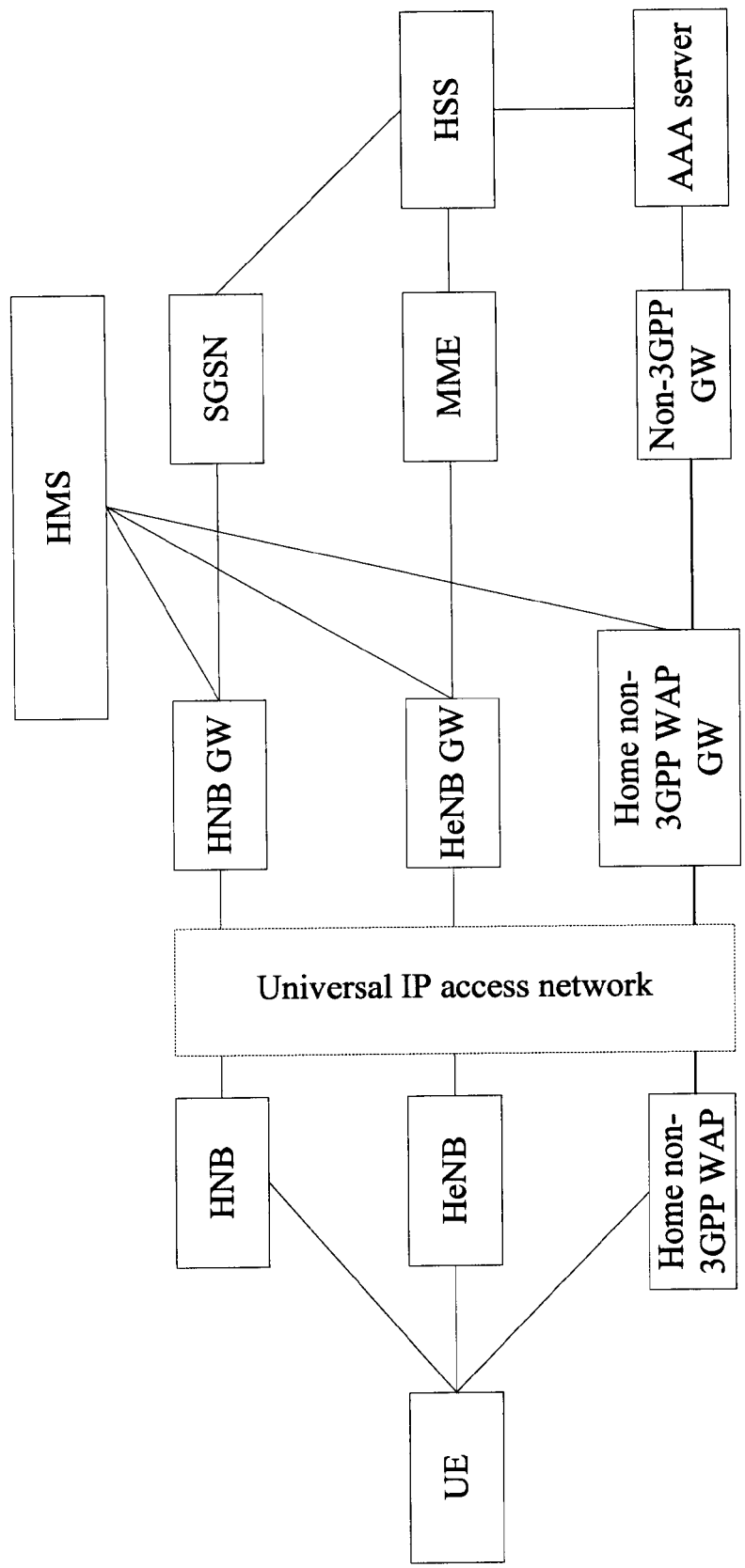
FIG. 3 shows an architecture of a home access system according to an embodiment of the present invention.

To better describe the technical solution of the second embodiment, FIG. 3 illustrates one of the home access system architectures. In the architecture, the HNB is a home WAP running on the UTRAN spectrum; the HeNB is a home WAP running on the E-UTRAN spectrum; the home non-3GPP WAP is a home WAP running on the spectrum of a non-3GPP network (such as a CDMA/WiMAX/WLAN/HRPD network).

The HNB GW, HeNB GW, and home non-3GPP WAP GW are home WAP GWs respectively connected to the HNB, HeNB and home non-3GPP WAP through a universal IP access network.

The home WAP GW has the functions such as implementing managing and converging the home WAP, and routing and forwarding signaling data between the NEs in the home WAP and mobile network.

The NEs in the mobile network include: a mobility management entity (MME) in the E-UTRAN, a serving GPRS support node (SGSN) in the GPRS/UMTS, and a non-3GPP GW, also known as a mobile access gateway (MAG), in a non-3GPP network. The non-3GPP GW is varied in different non-3GPP networks. For example, it may be an evolved packet data gateway (EPDG) in the WLAN, an access service network gateway (ASN GW) in the WiMAX network, an access gateway (AGW) in the CDMA network, and an HRPD serving gateway (HSGW) in the HRPD network.

A home subscriber server (HSS) is configured to store subscription information of the UE. An authentication, authorization and accounting server (AAA server) is configured to authenticate, authorize, and charge the UE.

A home management server (HMS) is responsible for CSG management of the UE. The HMS may be an independent NE, or be integrated into other NEs such as the HSS. The HMS may be connected to the GW of the home access point, or be directly connected to the home WAP, which is not restricted. FIG. 3 shows the connections between the HMS and the GW of the home access point.

Moreover, the above describes only one of the home access system architectures. For example, in another home access system architecture, the home access point may be directly connected to an NE in the mobile network.

In this embodiment, the core management NE may be the SGSN, MME, or non-3GPP GW.

The source access NE may obtain the allowed CSG list information of the UE in at least one of the following ways:

(1) When the UE accesses the core management NE, the core management NE notifies the allowed CSG list information of the UE to the source access NE. For example, in the access procedure, in the E-UTRAN, the MME notifies the allowed CSG list information of the UE to the source access NE through an Initial Context Setup Request message; in the UTRAN, the SGSN notifies the allowed CSG list information of the UE to the source access NE through an Information Transfer Indication message.

Note: Obtaining the allowed CSG list information of the UE by the source access NE is optional. If the UE has no subscribed allowed CSG list information, the core management NE does not notify the allowed CSG list of the UE to the source access NE, and therefore, the source access NE cannot obtain the allowed CSG list information of the UE.

(2) The allowed CSG list information of the UE is configured in the HMS or the back-end system of the operator, for example, the operation support system (OSS) or business and operation support system (BOSS) of the operator, and is sent by the HMS or the back-end system of the operator to the access NE. For example, after the access NE is powered on and starts work, the access NE sends a Register Request message to the HMS or the back-end system of the operator, and the HMS or the back-end system of the operator sends a Register Response message carrying the allowed CSG list information of the UE to the access NE.

Note: The process of obtaining the allowed CSG list information of the UE by the source access NE is optional. If the UE has no subscribed allowed CSG list information, the HMS or the back-end system of the operator does not notify the allowed CSG list of the UE to the source access NE, and therefore, the source access NE cannot obtain the allowed CSG list information of the UE.

The source access NE may obtain the access mode and CSG ID information of the target area in at least one of the following ways:

(1) The UE reports the access mode and CSG ID information of the target area to the source access NE through a measurement report.

(2) The source access NE is configured with a map between the target area and the access mode and between the target area and the CSG ID. The source access NE obtains the access mode and CSG ID information of the target area according to the map.

(3) The source access NE is configured with a map between the cell ID and the access mode and between the cell ID and the CSG ID. The UE reports the cell information through a measurement report, and the source access NE obtains the access mode and CSG ID information of the target area according to the cell information.

(4) The HMS or the back-end system of the operator, for example, the OSS or BOSS of the operator, is configured with a map between the target area and the access mode and between the target area and the CSG ID. The source access NE queries the HMS or the back-end system of the operator for the access mode and CSG ID of the target area. For example, the access NE sends a Register Request message to the HMS or the back-end system of the operator, and the HMS or the back-end system of the operator sends a Register Response message carrying the access mode and CSG ID information of the target area to the access NE.

Step 202: The source access NE decides whether to perform access and handover.

After obtaining the access mode and CSG ID of the target area, and the allowed CSG list information of the UE, the source access NE decides whether to hand over to the target area according to the access mode and/or whether the CSG ID of the target area is included in the allowed CSG list of the UE. The source access NE may determine whether to initiate handover in the following ways:

The source access NE first determines the access mode of the target area. Specific determination steps are as follows:

(1) If the access mode of the target area is the Hybrid Access Mode, the source access NE selects the target area to initiate a handover procedure regardless of whether the CSG ID of the target area is included in the allowed CSG list of the UE. Optionally, the source access NE further determines whether the CSG ID of the target area is included in the allowed CSG list of the UE; if the CSG ID of the target area is included in the allowed CSG list of the UE, the UE is a CSG member in the target area; if the CSG ID of the target area is not included in the allowed CSG list of the UE, the UE is a non-CSG member in the target area, so that the information about whether the UE is a CSG member can be transmitted to the target access NE subsequently. Or (2) If the access mode of the target area is the Closed Access Mode, the source access NE further determines whether the CSG ID of the target area is included in the allowed CSG list of the UE. If the CSG ID of the target area is included in the allowed CSG list of the UE, the source access NE selects the target area to initiate a handover procedure; if the CSG ID of the target area is not included in the allowed CSG list of the UE, the source access NE cannot select the target area to initiate a handover procedure.

Another way is: The source access NE first determines whether the CSG ID of the target area is included in the allowed CSG list of the UE. Specific determination steps are as follows:

(1) If the CSG ID of the target area is included in the allowed CSG list of the UE, the UE is a CSG member in the target area, and the source access NE selects the target area to initiate a handover procedure.

(2) If the CSG ID of the target area is not included in the allowed CSG list of the UE, that is, the UE is a non-CSG member in the target area, the source access NE determines which access mode the access mode of the target area is. If the access mode of the target area is the Hybrid Access Mode, the source access NE selects the target area to initiate a handover procedure; if the access mode of the target area is the Closed Access Mode, the source access NE cannot select the target area to initiate a handover procedure.

Note: If the source access NE obtains the access mode and CSG ID of the target area, but obtains no allowed CSG list of the UE, for example, the UE has no subscribed allowed CSG list information, the source access NE can decide, according to the access mode of the target area, whether to be handed over to the target area. The source access NE may determine whether to initiate handover in the following ways:

The source access NE first determines the access mode of the target area. Specific determination steps are as follows:

(1) If the access mode of the target area is the Hybrid Access Mode, the source access NE selects the target area to initiate a handover procedure; optionally, because the allowed CSG list of the UE is not obtained, the source access NE may further determine the UE is a non-CSG member in the target area, so as to transmit the information that the UE is a non-CSG member to the target access NE subsequently. Or (2) If the access mode of the target area is the Closed Access Mode, the source access NE cannot select the target area to initiate a handover procedure.

Another way is: The source access NE first knows that the allowed CSG list of the UE is not obtained, that is, the UE is a non-CSG member in the target area, and then the source access NE determines which access mode the access mode of the target area is. If the access mode of the target area is the Hybrid Access Mode, the source access NE selects the target area to initiate a handover procedure; if the access mode of the target area is the Closed Access Mode, the source access NE cannot select the target area to initiate a handover procedure.

Step 203: The source access NE sends a Handover Request message to the target access NE after deciding to initiate a handover procedure.

Further, the message may carry the information about whether the UE is a CSG member in the target area, so that the target access NE can perform special processing on the CSG member, where the special processing is different from that on the non-CSG member, for example, differentiated quality of service (QoS) control, which can enable the CSG member to use network resources with higher priority than a non-CSG member. The presentation form of the information may include at least one of the following:

(1) An indication about whether the UE is a CSG member may be carried. For example, when it is determined that the UE is a CSG member, a CSG member indication indicating that the UE is a CSG member is carried; when it is determined that the UE is a non-CSG member, the indication indicating that the UE is a non-CSG member is not carried. Or, when it is determined that the UE is a non-CSG member, a non-CSG member indication indicating that the UE is a non-CSG member is carried; when it is determined that the UE is a CSG member, the indication indicating that the UE is a CSG member is not carried.

(2) A type value may be set to indicate whether the UE is a CSG member. For example, when it is determined that the UE is a CSG member, a "CSG member type" value is set to "YES", indicating that the UE is a CSG member; when it is determined that the UE is a non-CSG member, the "CSG member type" value is set to "NO", indicating that the UE is a non-CSG member.

Step 204: The target access NE returns a Handover Request Ack message to the source access NE.

The message may carry the access mode and CSG ID information of the target area.

Step 205: The source access NE sends a Handover Command message to the UE, notifying the UE to hand over to the target area.

In this step, optionally, notifying the target access NE of whether the UE is a CSG member in step 203 may be implemented in steps 205 and 206 in the following way: The UE may determine whether the CSG ID of the target area is included in the allowed CSG list of the UE; if the CSG ID of the target area is included in the allowed CSG list of the UE, the UE is a CSG member in the target area; if the CSG ID of the target area is not included in the allowed CSG list of the UE, the UE is a non-CSG member in the target area. The UE may obtain the access mode and CSG ID information of the target area in at least one of the following ways:

(1) The source access NE may carry the access mode and CSG ID information of the target area in the Handover Command message.

(2) The access mode and CSG ID information of the target area may be obtained through cell broadcast.

Note: Optionally, if the UE has no subscribed allowed CSG list information, the UE is determined as a non-CSG member in the target area.

Step 206: The UE hands over to the target area, and sends a Handover Confirm message to the target access NE.

Further, the message may carry the information about whether the UE is a CSG member in the target area, so that the target access NE can perform special processing on the CSG member subsequently, for example, differentiated QoS control.

Step 207: The target access NE sends a Path Switch Request message to the core management NE.

If an AGW exists, the message is sent to the core management NE through the target AGW.

Step 208: The core management NE returns a Path Switch Request Ack message to the target access NE.

If an AGW exists, the message is sent to the target access NE through the target AGW.

Step 209: The target AGW sends a Release Resource message to the source access NE.

Up to now, the process of the source access NE deciding whether to initiate handover and making the UE to be handed over to the target area ends.

Figure 4:
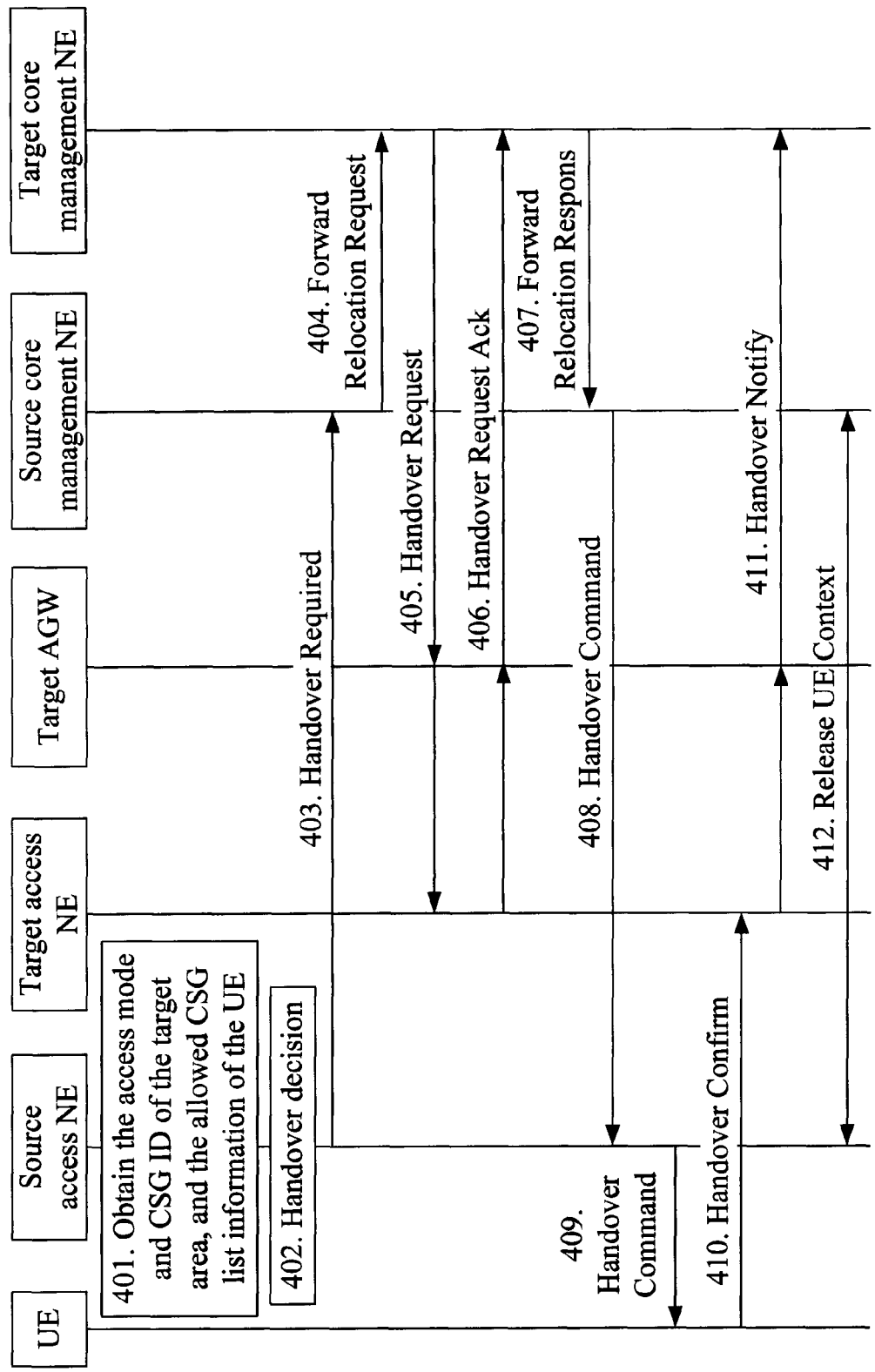
FIG. 4 is a signaling flowchart of a handover control method in way 2 according to the second embodiment of the present invention.

Way 2: This way deals with an S1-based handover, where S1 represents an S1 interface. The source access NE and the target access NE cannot transmit a message to each other, and need to transmit messages through the core management NE. As shown in FIG. 4, the flowchart of this way includes the following steps:

Step 401: The source access NE obtains the access mode and CSG ID of the target area, and the allowed CSG list information of the UE.

The process of the source access NE obtaining the access mode and CSG ID of the target area, and the allowed CSG list information of the UE is similar to step 201 in way 1 of the second embodiment, and is not described here.

Note: The process of obtaining the allowed CSG list information of the UE by the source access NE is optional. If the UE has no subscribed allowed CSG list information, the source access NE cannot obtain the allowed CSG list information of the UE.

Step 402: The source access NE makes a handover decision.

The handover decision process of the source access NE is similar to step 202 in way 1 of the second embodiment, and is not described here.

Note: If the source access NE obtains the access mode and CSG ID of the target area, but obtains no allowed CSG list of the UE, for example, the UE has no subscribed allowed CSG list information, the step of the source access NE making a handover decision and determining whether the UE is a CSG member is similar to step 202 in way 1 of the second embodiment, and is not described here.

Step 403: The source access NE sends a Handover Required message to the source core management NE after deciding to initiate a handover procedure.

The message may carry the information about whether the UE is a CSG member in the target area. For the presentation of the information, see the description in step 203 in way 1 of the second embodiment.

Step 404: The source core management NE sends a Forward Relocation Request message to the target core management NE.

The message may carry the information about whether the UE is a CSG member in the target area.

Step 405: The target core management NE sends a Handover Request message to the target access NE.

The message carries the information about whether the UE is a CSG member in the target area, so that the target access NE can perform special processing on the CSG member subsequently, for example, differentiated QoS control.

The target access NE may be a home WAP (such as an HNB, an HeNB, or a home non-3GPP WAP) or a WAP with the CSG function.

Step 406: The target access NE returns a Handover Request Ack message to the target core management NE.

The message may carry the access mode and CSG ID information of the target area.

If an AGW exists, the target access NE interacts with the target core management NE through the target AGW.

Step 407: The target core management NE returns a Forward Relocation Response message to the source core management NE.

The message may carry the access mode and CSG ID information of the target area.

Step 408: The source core management NE sends a Handover Command message to the source access NE.

The message may carry the access mode and CSG ID information of the target area.

Step 409: The source access NE sends a Handover Command message to the UE, notifying the UE to hand over to the target area.

Optionally, notifying the target access NE of whether the UE is a CSG member in step 405 may be implemented in steps 409 and 410 according to the following way: The UE may determine whether the CSG ID of the target area is included in the allowed CSG list of the UE; if the CSG ID of the target area is included in the allowed CSG list of the UE, the UE is a CSG member in the target area; if the CSG ID of the target area is not included in the allowed CSG list of the UE, the UE is a non-CSG member in the target area. The UE may obtain the access mode and CSG ID information of the target area with reference to step 205 in way 1 of the second embodiment.

Note: Optionally, if the UE has no subscribed allowed CSG list information, the UE is determined as a non-CSG member in the target area.

Step 410: The UE is handed over to the target area, and sends a Handover Confirm message to the target access NE.

Further, the message may carry the information about whether the UE is a CSG member in the target area, so that the target access NE can perform special processing on the CSG member subsequently, for example, differentiated QoS control.

Step 411: The target access NE sends a Handover Notify message to the target core management NE, notifying the target core management NE that the UE has handed over to the target area.

Step 412: The source core management NE interacts with the source access NE to release the UE context.

In the second embodiment of the present invention, the source access NE decides whether to hand over to the target area according to the access mode and/or whether the CSG ID of the target area is included in the allowed CSG list of the UE, and ensures the handover of the UE to the target area that the UE is allowed to access. Especially when the access mode of the target area is the Hybrid Access Mode, the UE is ensured to hand over to the target area even if the CSG ID of the target area is not included in the allowed CSG list of the UE, therefore ensuring service continuity of the UE and enhancing the user experience.

Optionally, when the access mode of the target area is the Hybrid Access Mode and the type of the UE in the target area is determined, the source access NE transmits the information to the target access NE. The target access NE implements differentiated QoS control according to whether the UE is a CSG member. For example, the target access NE implements differentiated QoS control on the CSG member, that is, enables the CSG member to use network resources with higher priority, which can further enhance the user experience.

Note: Optionally, when the access mode of the target area is the Hybrid Access Mode, even if the allowed CSG list of the UE is not obtained, for example, the UE has no subscribed allowed CSG list information, the UE is ensured to be handed over to the target area, therefore ensuring service continuity of the UE and enhancing the user experience.

Figure 5:
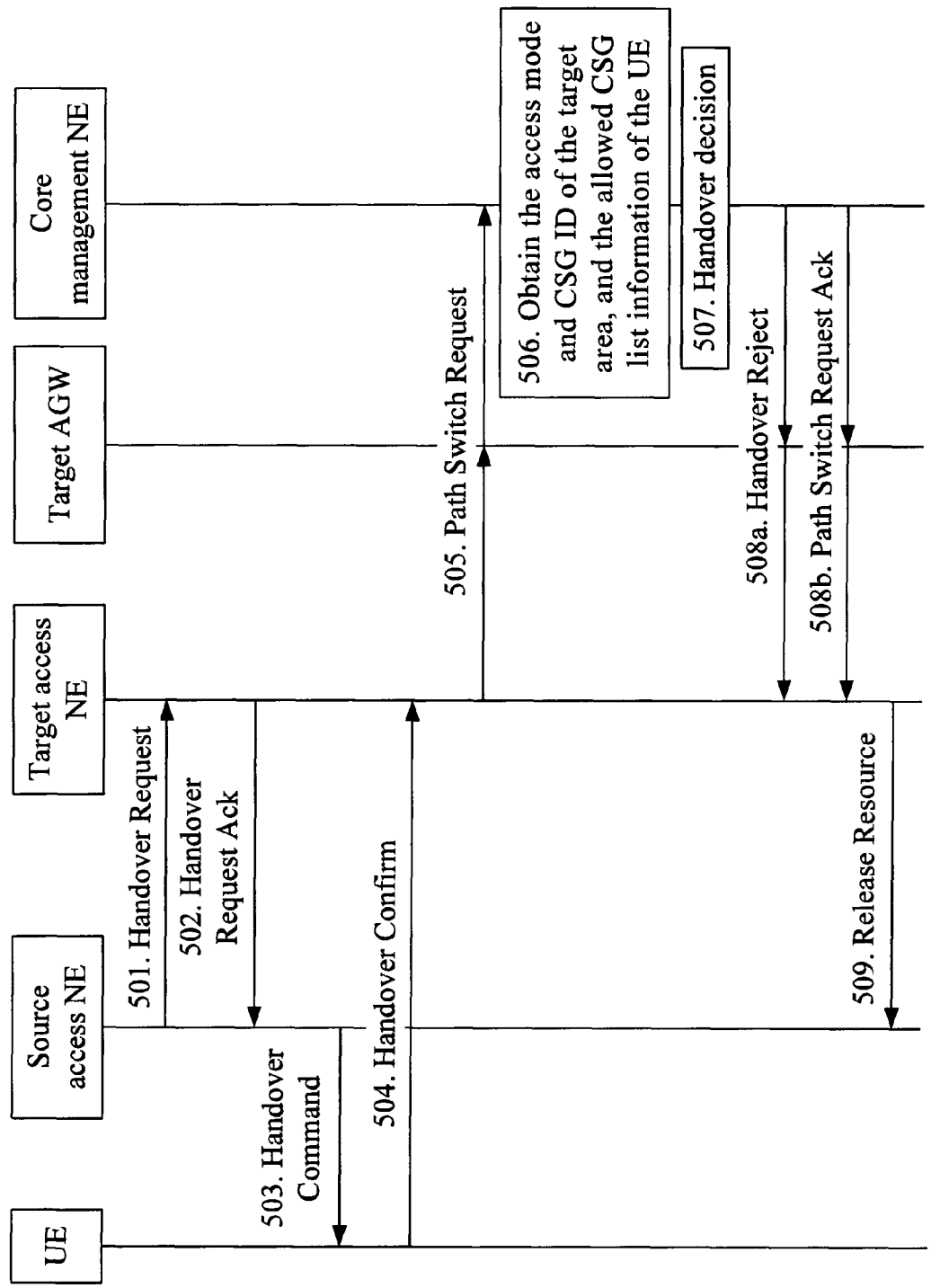
FIG. 5 is a signaling flowchart of a handover control method according to a third embodiment of the present invention.

In the handover control method of the third embodiment, the core management NE implements handover control during a handover. The third embodiment deals with X2-based handover. The source access NE and the target access NE can transmit a message to each other, and the core management NE remains unchanged, that is, the source core management NE and the target core management NE are a same core management NE. As shown in FIG. 5, the flowchart of the third embodiment includes the following steps:

Step 501: The source access NE sends a Handover Request message to the target access NE.

The target access NE may be a home WAP (for example, an HNB, an HeNB, or a home non-3GPP WAP), a WAP with the CSG function (for example, a NodeB, an eNodeB, or a non-3GPP WAP), an HNB GW, an HeNB GW, or a home non-3GPP WAP GW.

Step 502: The target access NE returns a Handover Request Ack message to the source access NE.

Optionally, the target access NE may carry the access mode and CSG ID information of the target area.

Step 503: The source access NE sends a Handover Command message to the UE, notifying the UE to hand over to the target area.

Optionally, the UE can determine whether the CSG ID of the target area is included in the allowed CSG list of the UE; if the CSG ID of the target area is included in the allowed CSG list of the UE, the UE is a CSG member in the target area; if the CSG ID of the target area is not included in the allowed CSG list of the UE, the UE is a non-CSG member in the target area. The UE may obtain the access mode and CSG ID information of the target area with reference to step 205 in way 1 of the second embodiment.

Note: Optionally, if the UE has no subscribed allowed CSG list information, the UE is determined as a non-CSG member in the target area.

Step 504: The UE is handed over to the target area, and sends a Handover Confirm message to the target access NE.

The message may carry the information about whether the UE is a CSG member in the target area, so that the target access NE can perform special processing on the CSG member subsequently, for example, differentiated QoS control.

Step 505: The target access NE sends a Path Switch Request message to the core management NE.

The target access NE may carry the access mode and CSG ID information of the target area in the message.

Step 506: The core management NE obtains the access mode and CSG ID information of the target area, and the allowed CSG list information of the UE.

The core management NE may obtain the access mode and CSG ID information of the target area in at least one of the following ways:

(1) The target access NE carries the access mode and CSG ID information of the target area in the Path Switch Request message.

(2) The core management NE is configured with a map between the target area and the access mode and between the target area and the CSG ID. The core management NE obtains the access mode and CSG ID information of the target area according to the map.

(3) The core management NE is configured with a map between the cell and the access mode and between the cell and the CSG ID. The target access NE carries cell information in the Path Switch Request message, and the core management NE obtains the access mode and CSG ID information of the target area according to the cell information.

(4) The HMS or the back-end system of the operator, for example, the OSS or BOSS of the operator, is configured with a map between the target area and the access mode and between the target area and the CSG ID. The core management NE queries the HMS or the back-end system of the operator for the access mode and CSG ID of the target area.

When the UE is registered with the core management NE, the core management NE may obtain the allowed CSG list information of the UE from the HSS. For example, the core management NE sends an Update Location message to the HSS, and the HSS returns an Update Location Ack message to the core management NE, where the Update Location Ack message carries the allowed CSG list information of the UE.

Note: The process of obtaining the allowed CSG list by the core management NE is optional. If the UE has no subscribed allowed CSG list information, the UE subscription information obtained by the core management NE from the HSS does not include the allowed CSG list of the UE, that is, the core management NE cannot obtain the allowed CSG list of the UE.

If an AGW exists, the message is sent to the core management NE through the target AGW.

Step 507: The core management NE decides whether to perform access and handover.

After obtaining the access mode and CSG ID of the target area, and the allowed CSG list information of the UE, the core management NE decides whether to hand over to the target area according to the access mode and/or whether the CSG ID of the target area is included in the allowed CSG list of the UE. The core management NE may determine whether to initiate handover in the following ways:

The core management NE first determines the access mode of the target area. Specific determination steps are as follows:

(1) If the access mode of the target area is the Hybrid Access Mode, the core management NE selects the target area to initiate a handover procedure and executes the subsequent step 508*b* regardless of whether the CSG ID of the target area is included in the allowed CSG list of the UE. Optionally, the core management NE determines whether the CSG ID of the target area is included in the allowed CSG list of the UE; if the CSG ID of the target area is included in the allowed CSG list of the UE, the UE is a CSG member in the target area; if the CSG ID of the target area is not included in the allowed CSG list of the UE, the UE is a non-CSG member in the target area, so that the information about whether the UE is a CSG member can be transmitted to the target access NE subsequently. Or (2) If the access mode of the target area is the Closed Access Mode, the core management NE determines whether the CSG ID of the target area is included in the allowed CSG list of the UE. If the CSG ID of the target area is included in the allowed CSG list of the UE, the core management NE selects the target area to initiate a handover procedure and executes the subsequent step 508*b*; if the CSG ID of the target area is not included in the allowed CSG list of the UE, the core management NE cannot select the target area to initiate a handover procedure and executes the subsequent step 508*a*.

Another way is: The core management NE first determines whether the CSG ID of the target area is included in the allowed CSG list of the UE. Specific determination steps are as follows:

(1) If the CSG ID of the target area is included in the allowed CSG list of the UE, the UE is a CSG member in the target area, and the core management NE selects the target area to initiate a handover procedure and executes the subsequent step 508*b*.

(2) If the CSG ID of the target area is not included in the allowed CSG list of the UE, that is, the UE is a non-CSG member in the target area, the core management NE determines which access mode the access mode of the target area is. If the access mode of the target area is the Hybrid Access Mode, the core management NE selects the target area to initiate a handover procedure and executes the subsequent step 508*b*; if the access mode of the target area is the Closed Access Mode, the core management NE cannot select the target area to initiate a handover procedure and executes the subsequent step 508*a*.

Note: If the core management NE obtains the access mode and CSG ID of the target area, but obtains no allowed CSG list of the UE, for example, the UE has no subscribed allowed CSG list information, the step of the core management NE making a handover decision and determining whether the UE is a CSG member is similar to step 202 in way 1 of the second embodiment, and is not described here.

Step 508*a*: The core management NE rejects access and handover.

If the core management NE rejects the Path Switch Request message of the target access NE, the core management NE sends a Handover Reject message to the target access NE. The Handover Reject message may carry an indication indicating that the rejection is caused by CSG access restricted (for example, the message carries the "Cause" value "CSG Access Restricted"), or the message carries the allowed CSG list information of the UE, and in this way, the source access NE does not select the target area for handover subsequently.

Step 508b: The core management NE accepts access and handover.

If the core management NE accepts the Path Switch Request message of the target access NE, the core management NE returns a Path Switch Request Ack message to the target access NE, where the Path Switch Request Ack message may carry the information about whether the UE is a CSG member in the target area, so that the target access NE can perform special processing on the CSG member subsequently, for example, differentiated QoS control.

Step 509: The target access NE sends a Release Resource message to the source access NE.

Up to now, the process of the core management NE deciding whether to initiate handover and making the UE to be handed over to the target area ends.

In the third embodiment of the present invention, the core management NE decides whether to hand over to the target area according to the access mode and/or whether the CSG ID of the target area is included in the allowed CSG list of the UE, and ensures the handover of the UE to the target area that the UE is allowed to access. Especially when the access mode of the target area is the Hybrid Access Mode, the UE is ensured to be handed over to the target area even if the CSG ID of the target area is not included in the allowed CSG list of the UE, therefore ensuring service continuity of the UE and enhancing the user experience. Optionally, the access mode and CSG ID of the target area may be provided by the target access NE, which can reduce the modifications caused to the prior art by the source access NE obtaining the information. For example, the information is carried in the measurement report reported by the UE. Moreover, the information provided by the target access NE is more reliable.

Optionally, when the access mode of the target area is the Hybrid Access Mode and the type of the UE in the target area is determined, the source access NE transmits the information to the target access NE. The target access NE implements differentiated QoS control according to whether the UE is a CSG member. For example, the target access NE implements differentiated QoS control on the CSG member, that is, enables the CSG member to use network resources with higher priority, which can further enhance the user experience.

Note: Optionally, when the access mode of the target area is the Hybrid Access Mode, even if the allowed CSG list of the UE is not obtained, for example, the UE has no subscribed allowed CSG list information, the UE is ensured to be handed over to the target area, therefore ensuring service continuity of the UE and enhancing the user experience.

Figure 6:
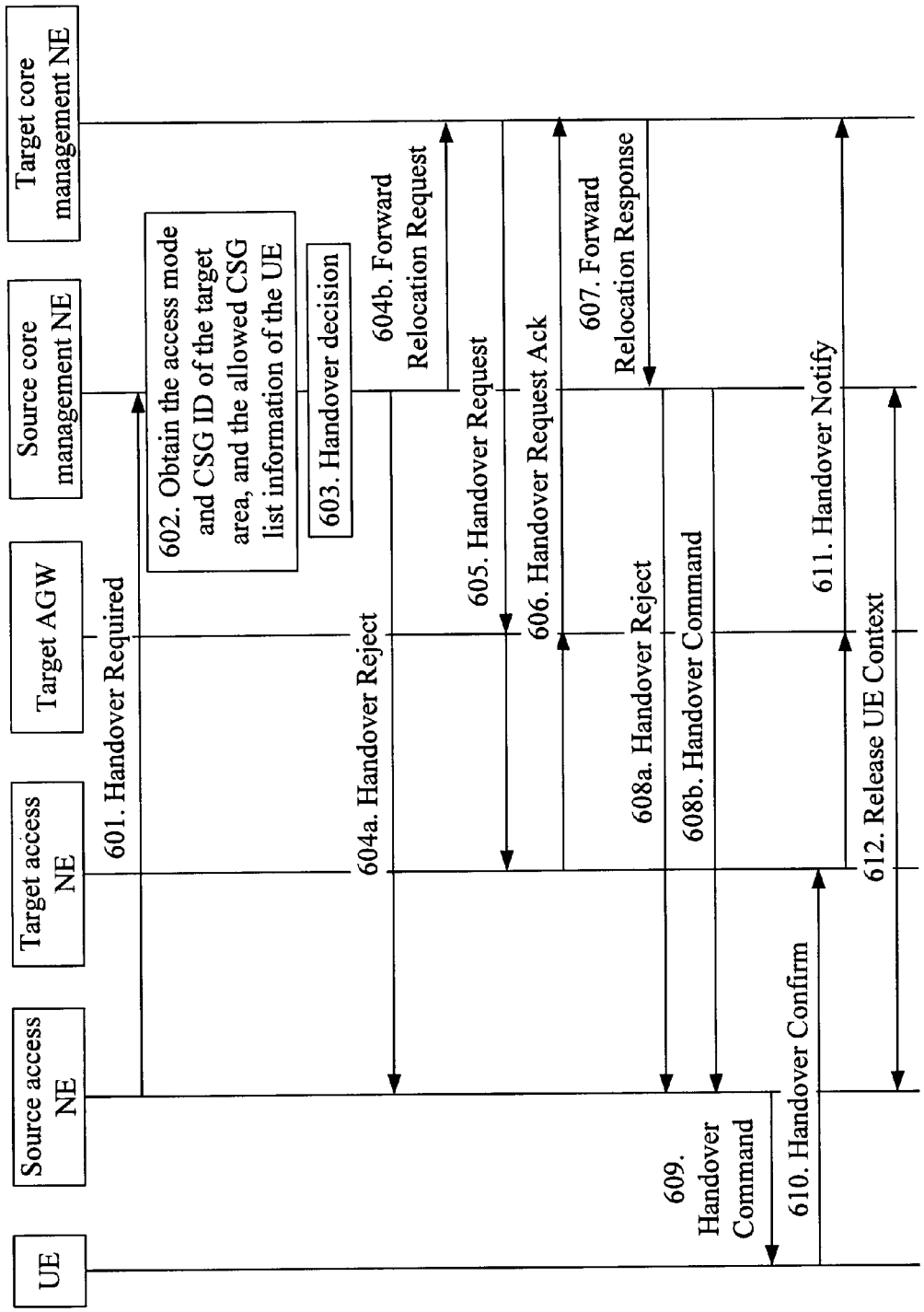
FIG. 6 is a signaling flowchart of a handover control method according to a fourth embodiment of the present invention.

In the handover control method of the fourth embodiment, the source core management NE implements handover control during a handover. The fourth embodiment deals with S1-based handover. The source access NE and the target access NE cannot transmit a message to each other, and need to transmit messages through the core management NE, and the core management NE is changed. As shown in FIG. 6, the flowchart of the fourth embodiment includes the following steps:

Step 601: The source access NE sends a Handover Required message to the source core management NE.

Step 602: The source core management NE obtains the access mode and CSG ID information of the target area, and the allowed CSG list information of the UE.

The source core management NE may obtain the access mode and CSG ID information of the target area in at least one of the following ways:

(1) The source access NE carries the access mode and CSG ID information of the target area in the Handover Required message.

(2) The source core management NE is configured with a map between the target area and the access mode and between the target area and the CSG ID. The source core management NE obtains the access mode and CSG ID information of the target area according to the map.

(3) The source core management NE is configured with a map between the cell and the access mode and between the cell and the CSG ID. The source access NE carries cell information in the Handover Required message, and the source core management NE obtains the access mode and CSG ID information of the target area according to the cell information.

(4) The HMS or the back-end system of the operator, for example, the OSS or BOSS of the operator, is configured with a map between the target area and the access mode and between the target area and the CSG ID. The source core management NE queries the HMS or the back-end system of the operator for the access mode and CSG ID of the target area.

When the UE is registered with the source core management NE, the source core management NE may obtain the allowed CSG list information of the UE from the HSS. For example, the source core management NE sends an Update Location message to the HSS, and the HSS returns an Update Location Ack message to the source core management NE, where the Update Location Ack message carries the allowed CSG list information of the UE.

Note: Obtaining the allowed CSG list by the source core management NE is optional. If the UE has no subscribed allowed CSG list information, the UE subscription information obtained by the source core management NE from the HSS does not include the allowed CSG list of the UE, that is, the source core management NE cannot obtain the allowed CSG list of the UE.

Step 603: The source core management NE decides whether to perform access and handover.

After obtaining the access mode and CSG ID of the target area, and the allowed CSG list information of the UE, the source core management NE decides whether to hand over to the target area according to the access mode and/or whether the CSG ID of the target area is included in the allowed CSG list of the UE. The source core management NE may determine whether to initiate handover in the following ways:

The source core management NE first determines the access mode of the target area. Specific determination steps are as follows:

(1) If the access mode of the target area is the Hybrid Access Mode, the source core management NE selects the target area to initiate a handover procedure and executes the subsequent step 604b regardless of whether the CSG ID of the target area is included in the allowed CSG list of the UE. Optionally, the source core management NE determines whether the CSG ID of the target area is included in the allowed CSG list of the UE; if the CSG ID of the target area is included in the allowed CSG list of the UE, the UE is a CSG member in the target area; if the CSG ID of the target area is not included in the allowed CSG list of the UE, the UE is a non-CSG member in the target area, so that the information about whether the UE is a CSG member can be transmitted to the target access NE subsequently. Or (2) If the access mode of the target area is the Closed Access Mode, the source core management NE determines whether the CSG ID of the target area is included in the allowed CSG list of the UE. If the CSG ID of the target area is included in the allowed CSG list of the UE, the source core management NE selects the target area to initiate a handover procedure and executes the subsequent step 604*b*; if the CSG ID of the target area is not included in the allowed CSG list of the UE, the source core management NE cannot select the target area to initiate a handover procedure and executes the subsequent step 604*a*.

Another way is: The source core management NE first determines whether the CSG ID of the target area is included in the allowed CSG list of the UE. Specific determination steps are as follows:

(1) If the CSG ID of the target area is included in the allowed CSG list of the UE, the UE is a CSG member in the target area, and the source core management NE selects the target area to initiate a handover procedure and executes the subsequent step 604*b*.

(2) If the CSG ID of the target area is not included in the allowed CSG list of the UE, that is, the UE is a non-CSG member in the target area, the source core management NE determines which access mode the access mode of the target area is. If the access mode of the target area is the Hybrid Access Mode, the source core management NE selects the target area to initiate a handover procedure and executes the subsequent step 604*b*; if the access mode of the target area is the Closed Access Mode, the source core management NE cannot select the target area to initiate a handover procedure and executes the subsequent step 604*a*.

Note: If the source core management NE obtains the access mode and CSG ID of the target area, but obtains no allowed CSG list of the UE, for example, the UE has no subscribed allowed CSG list information, the step of the source core management NE making a handover decision and determining whether the UE is a CSG member is similar to step 202 in way 1 of the second embodiment, and is not described here.

Step 604*a*: The source core management NE rejects access and handover.

If the source core management NE rejects the Handover Required message of the source access NE, the source core management NE sends a Handover Reject message to the source access NE. The Handover Reject message may carry an indication indicating that the rejection is caused by CSG access restricted (for example, the message carries the "Cause" value "CSG Access Restricted"), or the message carries the allowed CSG list information of the UE, and in this way, the source access NE does not select the target area for handover subsequently.

Step 604*b*: The source core management NE accepts access and handover.

If the source core management NE accepts the Handover Required message of the source access NE, the source core management NE returns a Forward Relocation Request message to the target core management NE. The message may carry the information about whether the UE is a CSG member in the target area.

Step 605: The target core management NE sends a Handover Request message to the target access NE, where the Handover Request message may carry the information about whether the UE is a CSG member in the target area, so that the target access NE can perform special processing on the CSG member subsequently, for example, differentiated QoS control.

The target access NE may be a home WAP (such as an HNB, an HeNB, or a home non-3GPP WAP) or a WAP with the CSG function (such as a NodeB, an eNodeB, or a non-3GPP WAP).

Step 606: The target access NE returns a Handover Request Ack message to the target core management NE.

The message may carry the access mode and CSG ID information of the target area.

If an AGW exists, the target access NE interacts with the target core management NE through the target AGW.

Step 607: The target core management NE returns a Forward Relocation Response message to the source core management NE.

An optional solution of this step is:

If the access mode and CSG ID of the target area are not carried in the message that the source access NE sends to the source core management NE in step 601, the Forward Relocation Response message in step 607 may carry the access mode and CSG ID information of the target area, and the source core management NE decides whether to perform access and handover in this step, that is, after receiving the Forward Relocation Response message, the source core management NE determines whether to initiate handover.

If the source core management NE does not select the target area to initiate a handover procedure, the subsequent step 608*a* is executed; and if the source core management NE selects the target area to initiate a handover procedure, the subsequent step 608*b* is executed.

For the process of the source core management NE obtaining the access mode and CSG ID information of the target area, see the description in step 602 of this embodiment. In addition, the Forward Relocation Request message sent by the target core management NE may carry the access mode and CSG ID information of the target area.

For the process of the source core management NE making a handover decision and determining whether the UE is a CSG member, see the description in step 603 of this embodiment.

Note: If the source core management NE obtains the access mode and CSG ID of the target area, but obtains no allowed CSG list of the UE, for example, the UE has no subscribed allowed CSG list information, the step of the source core management NE making a handover decision and determining whether the UE is a CSG member is similar to step 202 in way 1 of the second embodiment, and is not described here.

Step 608*a*: The source core management NE rejects access and handover.

If the source core management NE indicates handover rejection, the source core management NE sends a Handover Reject message to the source access NE. The Handover Reject message may carry an indication indicating that the rejection is caused by CSG access restricted (for example, the message carries the "Cause" value "CSG Access Restricted"), or the message carries the allowed CSG list information of the UE, and in this way, the source access NE does not select the target area for handover subsequently.

Step 608*b*: The source core management NE accepts access and handover.

If the source core management NE indicates handover success, the source core management NE sends a Handover Command message to the source access NE.

The message may carry the information about whether the UE is a CSG member in the target area. Optionally, the message may carry the access mode and CSG ID information of the target area.

Step 609: If the source access NE receives the Handover Command message, the source access NE sends a Handover Command message to the UE, notifying the UE to be handed over to the target area.

Optionally, notifying the target access NE of whether the UE is a CSG member in step 605 may be implemented in steps 609 and 610 according to the following way: The UE may determine whether the CSG ID of the target area is included in the allowed CSG list of the UE; if the CSG ID of the target area is included in the allowed CSG list of the UE, the UE is a CSG member in the target area; if the CSG ID of the target area is not included in the allowed CSG list of the UE, the UE is a non-CSG member in the target area. The UE may obtain the access mode and CSG ID information of the target area with reference to step 205 in way 1 of the second embodiment. If the source access NE receives the Handover Reject message and the message carries an indication indicating that the handover rejection is caused by CSG access restricted, the source access NE does not select the target area to initiate a handover procedure subsequently.

Note: Optionally, if the UE has no subscribed allowed CSG list information, the UE is determined as a non-CSG member in the target area.

Step 610: The UE hands over to the target area, and sends a Handover Confirm message to the target access NE.

The message may carry the information about whether the UE is a CSG member in the target area, so that the target access NE can perform special processing on the CSG member subsequently, for example, differentiated QoS control.

Step 611: The target access NE sends a Handover Notify message to the target core management NE, notifying the target core management NE that the UE has handed over to the target area.

Step 612: The source core management NE interacts with the source access NE to release the UE context.

Up to now, the process of the source core management NE deciding whether to initiate handover and making the UE to be handed over to the target area ends.

In the fourth embodiment, the source core management NE decides whether to hand over to the target area according to the access mode and/or whether CSG ID of the target area is included in the allowed CSG list of the UE, so as to ensures the handover of the UE to the target area that the UE is allowed to access. Especially when the access mode of the target area is the Hybrid Access Mode, the UE is ensured to be handed over to the target area even if the CSG ID of the target area is not included in the allowed CSG list of the UE, therefore ensuring service continuity of the UE and enhancing the user experience. Optionally, the access mode and CSG ID of the target area may be provided by the target access NE, which can reduce the modifications caused to the prior art by the source access NE obtaining the information. For example, the information is carried in the measurement report reported by the UE. Moreover, the information provided by the target access NE is more reliable.

Optionally, when the access mode of the target area is the Hybrid Access Mode and the type of the UE in the target area is determined, the source access NE transmits the information to the target access NE. The target access NE implements differentiated QoS control according to whether the UE is a CSG member. For example, the target access NE implements differentiated QoS control on the CSG member, that is, enables the CSG member to use network resources with higher priority, which can further enhance the user experience.

Note: Optionally, when the access mode of the target area is the Hybrid Access Mode, even if the allowed CSG list of the UE is not obtained, for example, the UE has no subscribed allowed CSG list information, the UE is ensured to be handed over to the target area, therefore ensuring service continuity of the UE and enhancing the user experience.

Figure 7:
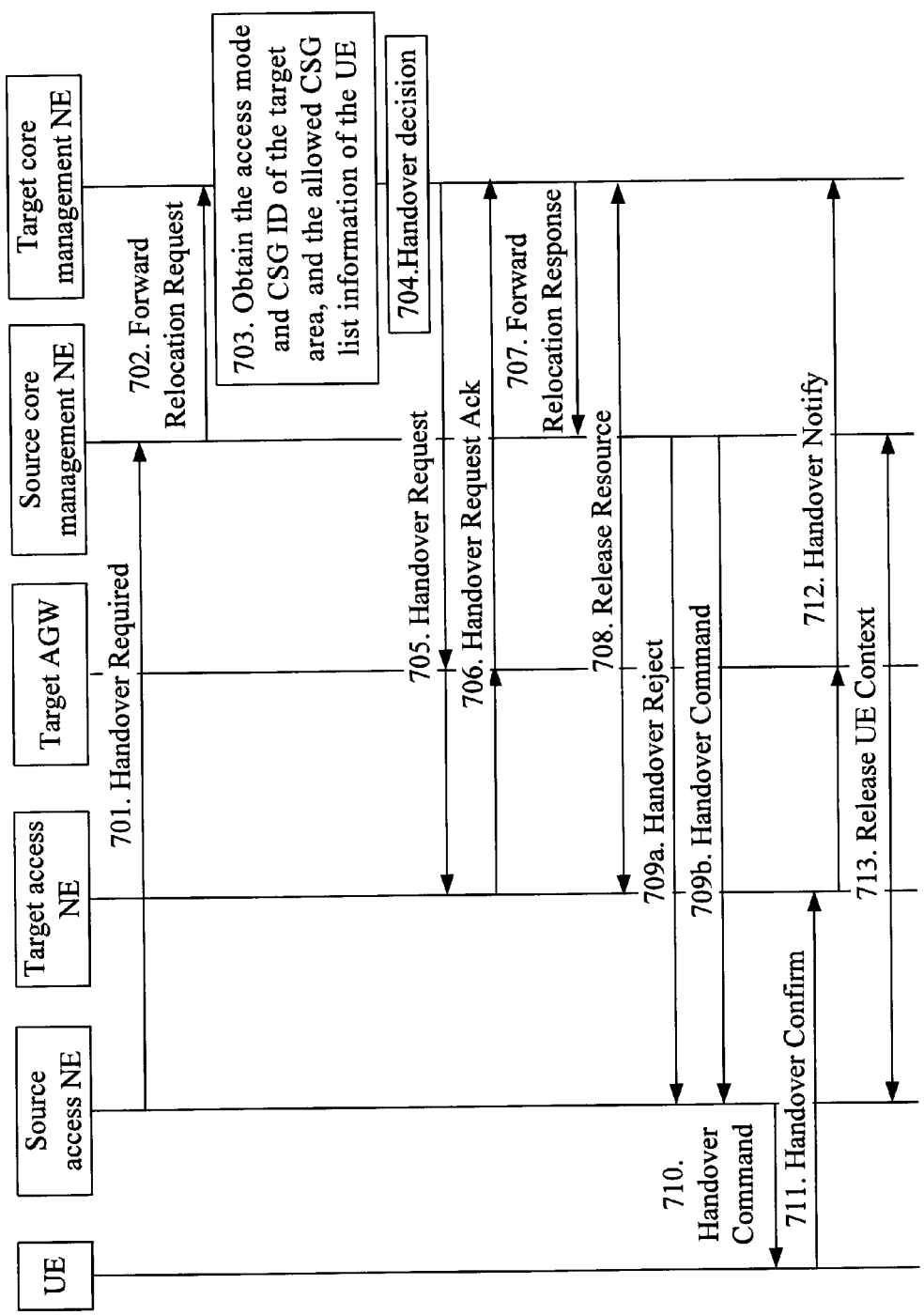
FIG. 7 is a signaling flowchart of a handover control method according to a fifth embodiment of the present invention.

In the handover control method of the fifth embodiment, the target core management NE implements handover control during a handover. The fifth embodiment deals with S1-based handover. The source access NE and the target access NE cannot transmit a message to each other, and need to transmit messages through the core management NE, and the core management NE is changed. As shown in FIG. 7, the flowchart of the fifth embodiment includes the following steps:

Step 701: The source access NE sends a Handover Required message to the source core management NE.

Step 702: The source core management NE sends a Forward Relocation Request message to the target core management NE.

The source core management NE may carry the allowed CSG list of the UE, and the access mode and CSG ID information of the target area in the Forward Relocation Request message. For the process of the source core management NE obtaining the allowed CSG list of the UE, and the access mode and CSG ID information of the target area, see the description in step 602 of the fourth embodiment.

Note: The source core management NE may carry or not carry the allowed CSG list information of the UE. If the UE has no subscribed allowed CSG list information, the UE subscription information obtained by the source core management NE from the HSS does not include the allowed CSG list of the UE, that is, the source core management NE cannot obtain the allowed CSG list of the UE.

Step 703: The target core management NE obtains the access mode and CSG ID information of the target area, and the allowed CSG list information of the UE.

The target core management NE may obtain the access mode and CSG ID information of the target area in at least one of the following ways:

(1) The Forward Relocation Request message sent by the source core management NE carries the access mode and CSG ID information of the target area.

(2) The target core management NE is configured with a map between the target area and the access mode and between the target area and the CSG ID. The target core management NE obtains the access mode and CSG ID information of the target area according to the map.

(3) The target core management NE is configured with a map between the cell ID and the access mode and between the cell ID and the CSG ID. The target access NE carries cell ID information in the Handover Request Ack message or the Forward Relocation Request message sent by the source core management NE carries cell ID information of the target access NE, and the target core management NE obtains the access mode and CSG ID information of the target area according to the cell ID.

(4) The HMS or the back-end system of the operator, for example, the OSS or BOSS of the operator, is configured with a map between the target area and the access mode and between the target area and the CSG ID. The target core management NE queries the HMS or the back-end system of the operator for the access mode and CSG ID of the target area.

Note: The process of obtaining the allowed CSG list information by the target core management NE is optional. If the UE has no subscribed allowed CSG list information, the source core management NE cannot obtain the allowed CSG list information of the UE, and the source core management NE cannot notify the allowed CSG list of the UE to the target core management NE. Therefore, the target core management NE cannot obtain the allowed CSG list information of the UE.

Step 704: The target core management NE decides whether to perform access and handover.

After obtaining the access mode and CSG ID of the target area, and the allowed CSG list information of the UE, the target core management NE decides whether to be handed over to the target area according to the access mode and/or whether the CSG ID of the target area is included in the allowed CSG list of the UE. For the process of the target core management NE determining whether to initiate handover and whether the UE is a CSG member, see the description in step 603 of the fourth embodiment.

Note: If the target core management NE obtains the access mode and CSG ID of the target area, but obtains no allowed CSG list of the UE, for example, the UE has no subscribed allowed CSG list information, the step of the target core management NE making a handover decision and determining whether the UE is a CSG member is similar to step 202 in way 1 of the second embodiment, and is not described here.

Step 705: The target core management NE accepts access and handover.

If the target core management NE accepts the Forward Relocation Request message of the source core management NE, the target core management NE sends a Handover Request message to the target access NE.

The message may carry the information about whether the UE is a CSG member in the target area, so that the target access NE can perform special processing on the CSG member subsequently, for example, differentiated QoS control.

The target access NE may be a home WAP (for example, an HNB, an HeNB, or a home non-3GPP WAP), a WAP with the CSG function (for example, a NodeB, an eNodeB, or a non-3GPP WAP), an HNB GW, an HeNB GW, or a home non-3GPP WAP GW.

Step 706: The target access NE returns a Handover Request Ack message to the target core management NE.

The target access NE may carry the access mode and CSG ID information of the target area in the message.

If an AGW exists, the target access NE interacts with the target core management NE through the target AGW.

If the handover decision is made in step 704, and the target core management NE refuses the UE for handing over to the target area, steps 705 and 706 are not executed.

Step 707: If the access mode and CSG ID of the target area are not carried in the Forward Relocation Request message that the source core management NE sends to the target core management NE in step 702, and the handover decision is not made in step 704, the process of determining whether to initiate handover may be also performed after step 706. That is, the target core management NE determines whether to initiate handover after receiving the Handover Request Ack message from the target access NE.

For the process of the target core management NE obtaining the access mode and CSG ID information of the target area, see the description in step 703 of this embodiment. In addition, the Handover Request Ack message sent by the target access NE may carry the access mode and CSG ID information of the target area.

For the process of the target core management NE making a handover decision and determining whether the UE is a CSG member, see the description in step 704 of this embodiment.

Note: If the target core management NE obtains the access mode and CSG ID of the target area, but obtains no allowed CSG list of the UE, for example, the UE has no subscribed allowed CSG list information, the step of the target core management NE making a handover decision and determining whether the UE is a CSG member is similar to step 202 in way 1 of the second embodiment, and is not described here.

After the target core management NE makes a handover decision, the target core management NE returns a Forward Relocation Response message to the source core management NE.

If the target core management NE indicates handover success, the target core management NE sends a Forward Relocation Response message to the source core management NE and executes the subsequent step 709*b*. The message may carry the information about whether the UE is a CSG member in the target area. Optionally, the message may carry the access mode and CSG ID information of the target area.

If the access mode of the target area is the Closed Access Mode and the CSG ID is not included in the allowed CSG list of the UE, the target core management NE rejects the handover of the UE, and returns a Forward Relocation Response message indicating handover rejection to the source core management NE, and executes step 709*a* subsequently.

Step 708: If the handover decision is made by the target core management NE after step 706, and the target core management NE rejects the handover of the UE, the target core management NE interacts with the target access NE to release resources. In this way, the network resources established on the target network in steps 705 and 706 can be released and the waste of network resources is reduced.

If an AGW exists, the target core management NE interacts with the target access NE through the target AGW.

Step 709*a*: The target core management NE rejects access and handover.

If the target core management NE indicates handover rejection, the source core management NE sends a Handover Reject message to the source access NE. The Handover Reject message may carry an indication indicating that the rejection is caused by CSG access restricted (for example, the message carries the "Cause" value "CSG Access Restricted"), or the message carries the allowed CSG list information of the UE, and in this way, the source access NE does not select the target area for handover subsequently.

Step 709*b*: The target core management NE accepts access and handover.

If the target core management NE indicates handover success, the source core management NE sends a Handover Command message to the source access NE.

The message may carry the information about whether the UE is a CSG member in the target area. Optionally, the message may carry the access mode and CSG ID information of the target area.

Step 710: If the source access NE receives the Handover Command message, the source access NE sends a Handover Command message to the UE, notifying the UE to hand over to the target area.

Optionally, notifying the target access NE of whether the UE is a CSG member in step 705 may be implemented in step 710 according to the following way: The UE may determine whether the CSG ID of the target area is included in the allowed CSG list of the UE; if the CSG ID of the target area is included in the allowed CSG list of the UE, the UE is a CSG member in the target area; if the CSG ID of the target area is not included in the allowed CSG list of the UE, the UE is a non-CSG member in the target area. The UE may obtain the access mode and CSG ID information of the target area with reference to step 205 in way 1 of the second embodiment.

If the source access NE receives the Handover Reject message and the message carries an indication indicating that the handover rejection is caused by CSG access restricted, the source access NE does not select the target area to initiate a handover procedure subsequently.

Note: Optionally, if the UE has no subscribed allowed CSG list information, the UE is determined as a non-CSG member in the target area.

Step 711: The UE hands over to the target area, and sends a Handover Confirm message to the target access NE.

The message may carry the information about whether the UE is a CSG member in the target area, so that the target access NE can perform special processing on the CSG member subsequently, for example, differentiated QoS control.

Step 712: The target access NE sends a Handover Notify message to the target core management NE, notifying the target core management NE that the UE has handed over to the target area.

Step 713: The source core management NE interacts with the source access NE to release the UE context.

Up to now, the process of the target core management NE deciding whether to initiate handover and making the UE to be handed over to the target area ends.

In the fifth embodiment, the target core management NE decides whether to hand over to the target area according to the access mode and/or whether the CSG ID of the target area is included in the allowed CSG list of the UE, and ensures the handover of the UE to the target area that the UE is allowed to access. Especially when the access mode of the target area is the Hybrid Access Mode, the UE is ensured to be handed over to the target area even if the CSG ID of the target area is not included in the allowed CSG list of the UE, therefore ensuring service continuity of the UE and enhancing the user experience. Optionally, the access mode and CSG ID of the target area may be provided by the target access NE, which can reduce the modifications caused to the prior art by the source access NE obtaining the information. For example, the information is carried in the measurement report reported by the UE. Moreover, the information provided by the target access NE is more reliable.

Optionally, when the access mode of the target area is the Hybrid Access Mode and the type of the UE in the target area is determined, the source access NE transmits the information to the target access NE. The target access NE implements differentiated QoS control according to whether the UE is a CSG member. For example, the target access NE implements differentiated QoS control on the CSG member, that is, enables the CSG member to use network resources with higher priority, which can further enhance the user experience.

Note: Optionally, when the access mode of the target area is the Hybrid Access Mode, even if the allowed CSG list of the UE is not obtained, for example, the UE has no subscribed allowed CSG list information, the UE is ensured to be handed over to the target area, therefore ensuring service continuity of the UE and enhancing the user experience.

Figure 8:
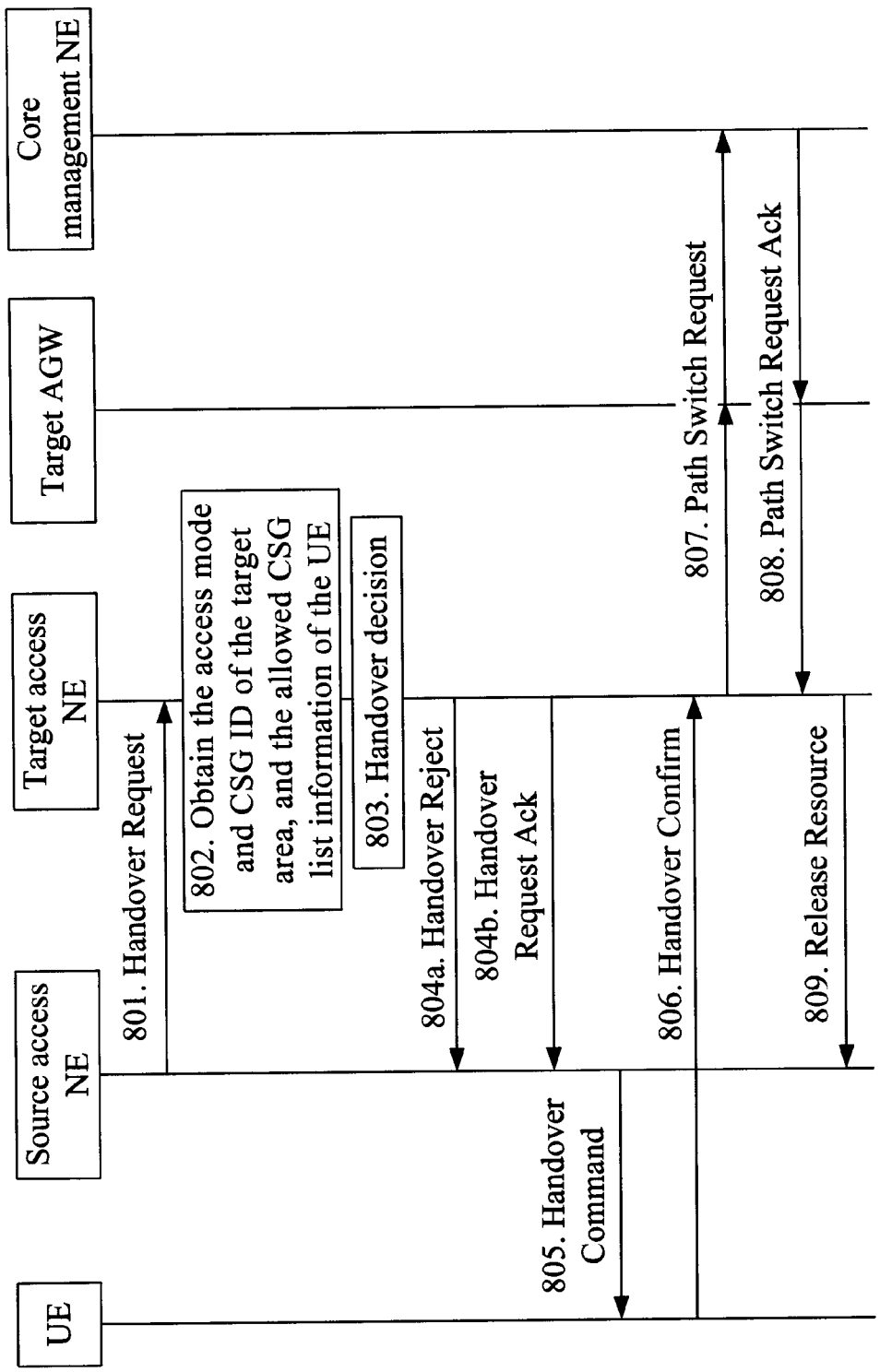
FIG. 8 is a signaling flowchart of a handover control method in way 1 according to a sixth embodiment of the present invention.

In the handover control method of the sixth embodiment, the target access NE implements handover control during a handover. According to different network topologies and handover procedures, the sixth embodiment includes two ways:

Way 1: This way deals with X2-based handover. The source access NE and the target access NE can transmit a message to each other, and the core management NE remains unchanged, that is, the source core management NE and the target core management NE are a same core management NE. As shown in FIG. 8, the flowchart of this way includes the following steps:

Step 801: The source access NE sends a Handover Request message to the target access NE.

The source access NE carries the allowed CSG list of the UE in the Handover Request message. For the process of obtaining the allowed CSG list information of the UE by the source access NE, see the description in step 201 of the first embodiment.

Note: The process of obtaining the allowed CSG list information of the UE by the source access NE is optional. If the UE has no subscribed allowed CSG list information, the source access NE cannot obtain the allowed CSG list information of the UE, as described in step 201 of the second embodiment.

Optionally, the source access NE may carry the access mode and CSG ID information of the target area in the Handover Request message.

Step 802: The target access NE obtains the access mode and CSG ID of the target area, and the allowed CSG list information of the UE.

The allowed CSG list information of the UE is notified by the source access NE to the target access NE through the Handover Request message.

Note: The process of obtaining the allowed CSG list information of the UE by the target access NE is optional. If the UE has no subscribed allowed CSG list information, the source access NE cannot notify the allowed CSG list of the UE to the target access NE, and the target access NE cannot obtain the allowed CSG list information of the UE.

The target access NE may obtain the access mode and CSG ID of the target area in at least one of the following ways:

(1) The target access NE receives the Handover Request message sent by the source access NE, where the Handover Request message carries the access mode and CSG ID of the target area.

(2) The target access NE queries the map between the target area ID and the access mode and between the target area ID and the CSG ID, and obtains the access mode and CSG ID of the target area according to the target area ID, where the target access NE is configured with the map between the target area ID and the access mode and between the target area ID and the CSG ID.

(3) The target access NE obtains the access mode and CSG ID of the target area according to the cell ID of the target area, where the cell ID includes the access mode and CSG ID of the target area and is notified by the source access NE to the target access NE through the Handover Request message.

(4) The HMS or the back-end system of the operator, for example, the OSS or BOSS of the operator, is configured with a map between the target area and the access mode and between the target area and the CSG ID. The target access NE queries the HMS or the back-end system of the operator for the access mode and CSG ID of the target area.

For example, the access NE sends a Register Request message to the HMS or the back-end system of the operator, and the HMS or the back-end system of the operator sends a Register Response message carrying the access mode and CSG ID information of the target area to the access NE.

Step 803: The target access NE decides whether to perform access and handover.

After obtaining the access mode and CSG ID of the target area, and the allowed CSG list information of the UE, the target access NE decides whether to hand over to the target area according to the access mode and/or whether the CSG ID of the target area is included in the allowed CSG list of the UE. The target access NE may determine whether to initiate handover in the following ways:

The target access NE first determines the access mode of the target area. Specific determination steps are as follows:

(1) If the access mode of the target area is the Hybrid Access Mode, the target access NE selects the target area to initiate a handover procedure and executes the subsequent step 804*b* regardless of whether the CSG ID of the target area is included in the allowed CSG list of the UE. Optionally, the target access NE determines whether the CSG ID of the target area is included in the allowed CSG list of the UE; if the CSG ID of the target area is included in the allowed CSG list of the UE, the UE is a CSG member in the target area; if the CSG ID of the target area is not included in the allowed CSG list of the UE, the UE is a non-CSG member in the target area, so that the target access NE can perform special processing on the CSG member subsequently, such as differentiated QoS control. Or (2) If the access mode of the target area is the Closed Access Mode, the target access NE further determines whether the CSG ID of the target area is included in the allowed CSG list of the UE. If the CSG ID of the target area is included in the allowed CSG list of the UE, the target access NE selects the target area to initiate a handover procedure and executes the subsequent step 804*b*; if the CSG ID of the target area is not included in the allowed CSG list of the UE, the target access NE cannot select the target area to initiate a handover procedure and executes the subsequent step 804*a*.

Another way is: The target access NE first determines whether the CSG ID of the target area is included in the allowed CSG list of the UE. Specific determination steps are as follows:

(1) If the CSG ID of the target area is included in the allowed CSG list of the UE, the UE is a CSG member in the target area, and the target access NE selects the target area to initiate a handover procedure and executes the subsequent step 804*b*.

(2) If the CSG ID of the target area is not included in the allowed CSG list of the UE, that is, the UE is a non-CSG member in the target area, the target access NE determines which access mode the access mode of the target area is. If the access mode of the target area is the Hybrid Access Mode, the target access NE selects the target area to initiate a handover procedure and executes the subsequent step 804*b*; if the access mode of the target area is the Closed Access Mode, the target access NE cannot select the target area to initiate a handover procedure and executes the subsequent step 804*a*.

Note: If the target access NE obtains the access mode and CSG ID of the target area, but obtains no allowed CSG list of the UE, for example, the UE has no subscribed allowed CSG list information, the step of the target access NE making a handover decision and determining whether the UE is a CSG member is similar to step 202 in way 1 of the second embodiment, and is not described here.

Step 804*a*: The target access NE rejects access and handover.

If the target access NE rejects the Handover Request message, the target access NE sends a Handover Reject message to the source access NE. The Handover Reject message may carry an indication indicating that the rejection is caused by CSG access restricted (for example, the message carries the "Cause" value "CSG Access Restricted"), or the message carries the allowed CSG list information of the UE, and in this way, the source access NE does not select the target area for handover subsequently.

Step 804*b*: The target access NE accepts access and handover.

If the target access NE accepts the Handover Request message, the target access NE returns a Handover Request Ack message to the source access NE.

Optionally, the message may carry the access mode and CSG ID information of the target area.

Step 805: The source access NE sends a Handover Command message to the UE, notifying the UE to be handed over to the target area.

Optionally, determining whether the UE is a CSG member by the target access NE in step 803 may be implemented in step 805 according to the following way: The UE may determine whether the CSG ID of the target area is included in the allowed CSG list of the UE; if the CSG ID of the target area is included in the allowed CSG list of the UE, the UE is a CSG member in the target area; if the CSG ID of the target area is not included in the allowed CSG list of the UE, the UE is a non-CSG member in the target area. The UE may obtain the access mode and CSG ID information of the target area with reference to step 205 in way 1 of the second embodiment.

Note: Optionally, if the UE has no subscribed allowed CSG list information, the UE is determined as a non-CSG member in the target area.

Step 806: The UE hands over to the target area, and sends a Handover Confirm message to the target access NE.

The message may carry the information about whether the UE is a CSG member in the target area, so that the target access NE can perform special processing on the CSG member subsequently, for example, differentiated QoS control.

Step 807: The target access NE sends a Path Switch Request message to the core management NE.

When a target AGW exists in the network, the Path Switch Request message is sent to the core management NE through the target AGW.

Step 808: The core management NE returns a Path Switch Request Ack message to the target access NE.

Step 809: The target access NE sends a Release Resource message to the source access NE.

Up to now, in the network architecture of the X2 interface, the process of the target access NE deciding whether to initiate handover and making the UE to hand over to the target area ends.

Figure 9:
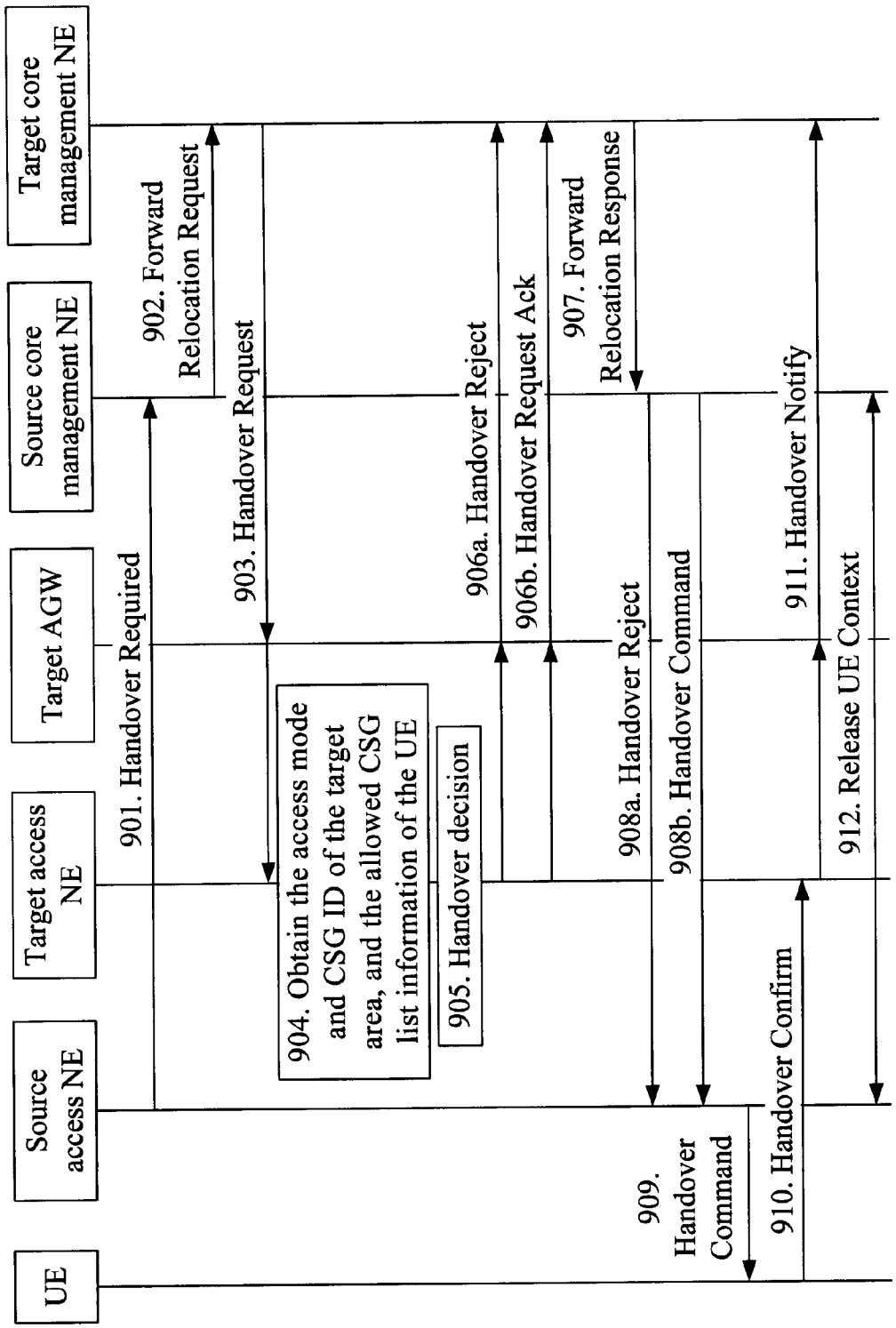
FIG. 9 is a signaling flowchart of a handover control method in way 2 according to the sixth embodiment of the present invention.

Way 2: This way deals with S1-based handover. The source access NE and the target access NE cannot transmit a message to each other, and need to transmit messages through the core management NE. As shown in FIG. 9, the flowchart of this way includes the following steps:

Step 901: The source access NE sends a Handover Required message to the source core management NE.

Optionally, the source access NE may carry the access mode and CSG ID information of the target area in the Handover Required message.

Step 902: The source core management NE sends a Forward Relocation Request message to the target core management NE.

Optionally, the source core management NE carries the access mode and CSG ID information of the target area in the Forward Relocation Request message.

Optionally, the source core management NE carries the allowed CSG list information of the UE in the Forward Relocation Request message.

Note: Whether the source core management NE carries the allowed CSG list information of the UE is optional. If the UE has no subscribed allowed CSG list information, the source core management NE cannot obtain the allowed CSG list information of the UE, and therefore, the source core management NE cannot carry the allowed CSG list information of the UE in the Forward Relocation Request message.

Step 903: The target core management NE sends a Handover Request message to the target access NE.

Optionally, the target core management NE carries the access mode and CSG ID information of the target area in the Handover Request message.

The target core management NE carries the allowed CSG list information of the UE in the Handover Request message.

Note: The target core management NE may carry or not carry the allowed CSG list information of the UE. If the UE has no subscribed allowed CSG list information, the source core management NE cannot notify the allowed CSG list information of the UE to the target core management NE, and the target core management NE cannot obtain the allowed CSG list information of the UE. Therefore, the target core management NE cannot carry the allowed CSG list information of the UE in the Handover Request message.

Step 904: The target access NE obtains the access mode and CSG ID of the target area, and the allowed CSG list information of the UE. The allowed CSG list information of the UE is notified by the target core management NE to the target access NE through the Handover Request message.

Note: The process of obtaining the allowed CSG list information of the UE by the target access NE is optional. If the UE has no subscribed allowed CSG list information, the target core management NE cannot notify the allowed CSG list of the UE to the target access NE, and the target access NE cannot obtain the allowed CSG list information of the UE.

The target access NE may obtain the access mode and CSG ID of the target area in at least one of the following ways:

(1) The target access NE receives the Handover Request message sent by the target core management NE, where the Handover Request message carries the access mode and CSG ID of the target area.

(2) The target access NE queries the map between the target area ID and the access mode and between the target area ID and the CSG ID, and obtains the access mode and CSG ID of the target area according to the target area ID, where the target access NE is configured with the map between the target area ID and the access mode and between the target area ID and the CSG ID.

(3) The target access NE obtains the access mode and CSG ID of the target area according to the cell ID of the target area, where the cell ID includes the access mode and CSG ID of the target area and is notified by the target core management NE to the target access NE through the Handover Request message.

(4) The HMS or the back-end system of the operator, for example, the OSS or BOSS of the operator, is configured with a map between the target area and the access mode and between the target area and the CSG ID. The target access NE queries the HMS or the back-end system of the operator for the access mode and CSG ID of the target area. For example, the access NE sends a Register Request message to the HMS or the back-end system of the operator, and the HMS or the back-end system of the operator sends a Register Response message carrying the access mode and CSG ID information of the target area to the access NE.

Step 905: The target access NE decides whether to perform access and handover.

After obtaining the access mode and CSG ID of the target area, and the allowed CSG list information of the UE, the target access NE decides whether to hand over to the target area according to the access mode and/or whether the CSG ID of the target area is included in the allowed CSG list of the UE. The step of the target access NE determining whether to initiate handover and whether the UE is a CSG member is similar to step 803 in way 1 of the sixth embodiment.

Note: If the target access NE obtains the access mode and CSG ID of the target area, but obtains no allowed CSG list of the UE, for example, the UE has no subscribed allowed CSG list information, the step of the target access NE making a handover decision and determining whether the UE is a CSG member is similar to step 202 in way 1 of the second embodiment, and is not described here.

Step 906a: The target access NE rejects access and handover.

If the target access NE rejects the Handover Request message, the target access NE sends a Handover Reject message to the target core management NE. The Handover Reject message may carry an indication indicating that the rejection is caused by CSG access restricted (for example, the message carries the "Cause" value "CSG Access Restricted"), or the message carries the allowed CSG list information of the UE, and in this way, the source access NE does not select the target area for handover subsequently.

Step 906b: The target access NE accepts access and handover.

If the target access NE accepts the Handover Request message, the target access NE returns a Handover Request Ack message to the core management NE.

Optionally, the message may carry the access mode and CSG ID information of the target area.

If an AGW exists, the target access NE interacts with the target core management NE through the target AGW.

Step 907: The target core management NE returns a Forward Relocation Response message to the source core management NE.

If the target core management NE receives the Handover Request Ack message, the target access NE indicates handover success, and the target core management NE sends a Forward Relocation Response message to the source core management NE. Then step 908b is executed. The message may carry the information about whether the UE is a CSG member in the target area. Optionally, the message may carry the access mode and CSG ID information of the target area.

If the target core management NE receives the Handover Reject message, the Forward Relocation Response message returned by the target core management NE to the source core management NE indicates handover rejection, and may carry an indication indicating that the rejection is caused by CSG access restricted (for example, the message carries the "Cause" value "CSG Access Restricted"). Then step 908a is executed.

Step 908a: The source core management NE sends a Handover Reject message to the source access NE.

If the target core management NE indicates handover rejection, the source core management NE sends a Handover Reject message to the source access NE. The Handover Reject message may carry an indication indicating that the handover rejection is caused by CSG access restricted (for example, the message carries the "Cause" value "CSG Access Restricted"). Or the message carries allowed CSG list information of the UE, so that the source access NE no longer selects the target area for handover subsequently.

Step 908b: The source core management NE sends a Handover Command message to the source access NE.

If the target core management NE indicates handover success, the source core management NE sends a Handover Command message to the source access NE.

Optionally, the message may carry the access mode and CSG ID information of the target area.

Step 909: If the source access NE receives the Handover Command message, the source access NE sends a Handover Command message to the UE, notifying the UE to hand over to the target area.

Optionally, notifying the target access NE of whether the UE is a CSG member in step 905 may be implemented in step 909 according to the following way: The UE may determine whether the CSG ID of the target area is included in the allowed CSG list of the UE; if the CSG ID of the target area is included in the allowed CSG list of the UE, the UE is a CSG member in the target area; if the CSG ID of the target area is not included in the allowed CSG list of the UE, the UE is a non-CSG member in the target area. The UE may obtain the access mode and CSG ID information of the target area with reference to step 205 in way 1 of the second embodiment.

If the source access NE receives the Handover Reject message and the message carries an indication indicating that the handover rejection is caused by CSG access restricted, the source access NE does not select the target area to initiate a handover procedure subsequently.

Note: Optionally, if the UE has no subscribed allowed CSG list information, the UE is determined as a non-CSG member in the target area.

Step 910: The UE hands over to the target area, and sends a Handover Confirm message to the target access NE.

The message may carry the information about whether the UE is a CSG member in the target area, so that the target access NE can perform special processing on the CSG member subsequently, for example, differentiated QoS control.

Step 911: The target access NE sends a Handover Notify message to the target core management NE, notifying the target core management NE that the UE has handed over to the target area.

Step 912: The source core management NE interacts with the source access NE to release the UE context.

Up to now, in the network architecture of the S1 interface, the process of the target access NE deciding whether to initiate handover and making the UE to be handed over to the target area ends.

In the sixth embodiment, the target access NE decides whether to hand over to the target area according to the access mode and/or whether the CSG ID of the target area is included in the allowed CSG list of the UE, and ensures the handover of the UE to the target area that the UE is allowed to access. Especially when the access mode of the target area is the Hybrid Access Mode, the UE is ensured to be handed over to the target area even if the CSG ID of the target area is not included in the allowed CSG list of the UE, therefore ensuring service continuity of the UE and enhancing the user experience. Optionally, the access mode and CSG ID of the target area may be provided by the target access NE, which can reduce the modifications caused to the prior art by the source access NE obtaining the information. For example, the information is carried in the measurement report reported by the UE. Moreover, the information provided by the target access NE is more reliable.

Optionally, when the access mode of the target area is the Hybrid Access Mode and the type of the UE in the target area is determined, the source access NE transmits the information to the target access NE. The target access NE implements differentiated QoS control according to whether the UE is a CSG member. For example, the target access NE implements differentiated QoS control on the CSG member, that is, enables the CSG member to use network resources with higher priority, which can further enhance the user experience.

Note: Optionally, when the access mode of the target area is the Hybrid Access Mode, even if the allowed CSG list of the UE is not obtained, for example, the UE has no subscribed allowed CSG list information, the UE is ensured to be handed over to the target area, therefore ensuring service continuity of the UE and enhancing the user experience.

Figure 10:
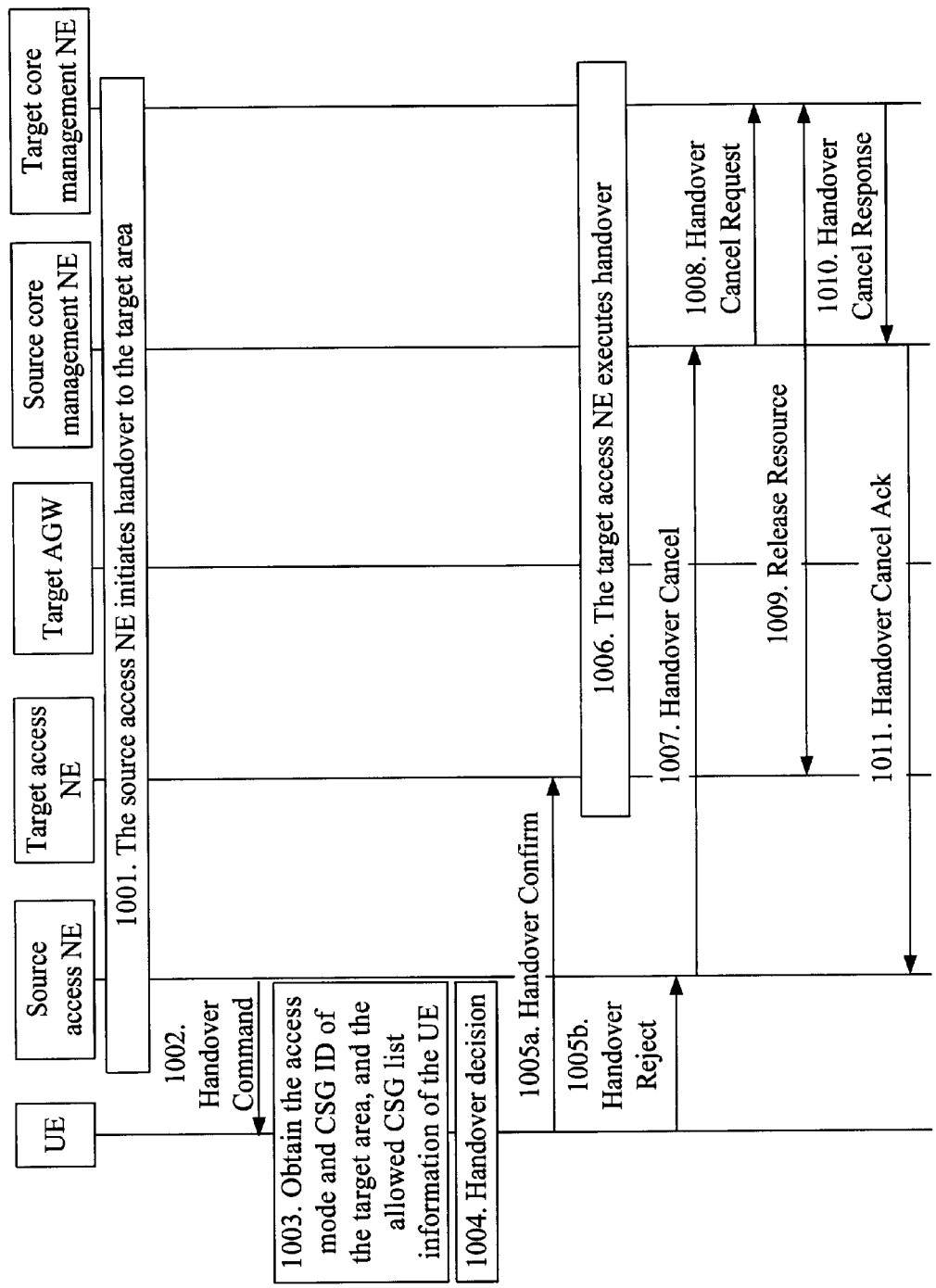
FIG. 10 is a signaling flowchart of a handover control method according to a seventh embodiment of the present invention.

In the handover control method of the seventh embodiment, the UE implements handover control during a handover. The flowchart of the seventh embodiment is shown in FIG. 10 and includes the following steps:

Step 1001: The source access NE initiates handover to the target area, which is similar to the handover process described in the first embodiment to the sixth embodiment.

Step 1002: The source access NE sends a Handover Command message to the UE, notifying the UE to be handed over to the target area.

The message may carry the access mode and CSG ID information of the target area.

Step 1003: The UE obtains the access mode and CSG ID of the target area, and the allowed CSG list information of the UE.

Note: The process of obtaining the allowed CSG list information of the UE is optional, for example, the UE has no subscribed allowed CSG list information.

The UE may obtain the access mode and CSG ID information of the target area with reference to step 205 in way 1 of the second embodiment.

The UE determines whether the CSG ID of the target area is included in the allowed CSG list of the UE; if the CSG ID of the target area is included in the allowed CSG list of the UE, the UE is a CSG member in the target area; if the CSG ID of the target area is not included in the allowed CSG list of the UE, the UE is a non-CSG member in the target area.

Note: Optionally, if the UE has no subscribed allowed CSG list information, the UE is determined as a non-CSG member in the target area.

Step 1004: The UE decides whether to perform access and handover.

After obtaining the access mode and CSG ID of the target area, and the allowed CSG list information of the UE, the UE decides whether to be handed over to the target area according to the access mode and/or whether the CSG ID of the target area is included in the allowed CSG list of the UE. The UE may determine whether to initiate handover in the following ways:

The UE first determines the access mode of the target area. Specific determination steps are as follows:

(1) If the access mode of the target area is the Hybrid Access Mode, the UE selects the target area to initiate a handover procedure and executes the subsequent step 1005_a_ regardless of whether the CSG ID of the target area is included in the allowed CSG list of the UE. Optionally, the UE determines whether the CSG ID of the target area is included in the allowed CSG list of the UE; if the CSG ID of the target area is included in the allowed CSG list of the UE, the UE is a CSG member in the target area; if the CSG ID of the target area is not included in the allowed CSG list of the UE, the UE is a non-CSG member in the target area, so that the information about whether the UE is a CSG member can be transmitted to the target access NE subsequently. Or (2) If the access mode of the target area is the Closed Access Mode, the UE needs to further determine whether the CSG ID of the target area is included in the allowed CSG list of the UE. If the CSG ID of the target area is included in the allowed CSG list of the UE, the UE selects the target area to initiate a handover procedure and executes the subsequent step 1005_a_; if the CSG ID of the target area is not included in the allowed CSG list of the UE, the UE cannot select the target area to initiate a handover procedure and executes the subsequent step 1005_b_.

Another way is: The UE first determines whether the CSG ID of the target area is included in the allowed CSG list of the UE. Specific determination steps are as follows:

(1) If the CSG ID of the target area is included in the allowed CSG list of the UE, the UE is a CSG member in the target area, and the UE selects the target area to initiate a handover procedure and executes the subsequent step 1005a.

(2) If the CSG ID of the target area is not included in the allowed CSG list of the UE, that is, the UE is a non-CSG member in the target area, the UE determines which access mode the access mode of the target area is. If the access mode of the target area is the Hybrid Access Mode, the UE selects the target area to initiate a handover procedure and executes the subsequent step 1005a; if the access mode of the target area is the Closed Access Mode, the UE cannot select the target area to initiate a handover procedure and executes the subsequent step 1005b.

Note: If the UE obtains the access mode and CSG ID of the target area, but obtains no allowed CSG list of the UE, for example, the UE has no subscribed allowed CSG list information, the step of the UE making a handover decision and determining whether the UE is a CSG member is similar to step 202 in way 1 of the second embodiment, and is not described here.

Step 1005a: The UE accepts access and handover.

If the UE accepts the Handover Command message, the UE returns a Handover Confirm message to the target access NE.

Optionally, the message may carry the access mode and CSG ID information of the target area.

The message may carry the information about whether the UE is a CSG member in the target area, so that the target access NE can perform special processing on the CSG member subsequently, for example, differentiated QoS control.

Step 1005b: The UE rejects access and handover.

If the UE rejects the Handover Command message, the UE sends a Handover Reject message or a Handover Cancel message to the source access NE, indicating handover failure or handover cancellation, and the UE cannot be handed over to the target area. The Handover Reject message or Handover Cancel message may carry an indication indicating that the rejection or cancellation is caused by CSG access restricted (for example, the message carries the "Cause" value "CSG Access Restricted"), or the message carries the allowed CSG list information of the UE, and in this way, the source access NE does not select the target area for handover subsequently.

Step 1006: If the UE accepts the Handover Command message, the target access NE receives a Handover Confirm message sent from the UE, indicating that the UE can be handed over to the target area, and executes the handover procedure described in the preceding embodiments.

Step 1007: If the UE rejects the Handover Command message, the source access NE receives the Handover Reject or Handover Cancel message sent from the UE, indicating that the UE cannot be handed over to the target area, and the source access NE sends a Handover Cancel message to the source core management NE.

If the source access NE receives the Handover Reject or Handover Cancel message and the message carries an indication indicating that the handover rejection is caused by CSG access restricted, the source access NE does not select the target area to initiate a handover procedure subsequently.

Step 1008: The source core management NE sends a Handover Cancel Request message to the target core management NE.

Step 1009: The target core management NE interacts with the target access NE to release resources.

If an AGW exists, the target core management NE interacts with the target access NE through the target AGW.

Step 1010: The target core management NE sends a Handover Cancel Response message to the source core management NE.

Step 1011: The source core management NE sends a Handover Cancel Ack message to the source access NE.

In the seventh embodiment, the UE decides whether to be handed over to the target area according to the access mode and/or whether the CSG ID of the target area is included in the allowed CSG list of the UE, and ensures the handover of the UE to the target area that the UE is allowed to access. Especially when the access mode of the target area is the Hybrid Access Mode, the UE is ensured to be handed over to the target area even if the CSG ID of the target area is not included in the allowed CSG list of the UE, therefore ensuring service continuity of the UE and enhancing the user experience. Optionally, the access mode and CSG ID of the target area may be provided by the target access NE, which can reduce the modifications caused to the prior art by the source access NE obtaining the information. For example, the information is carried in the measurement report reported by the UE. Moreover, the information provided by the target access NE is more reliable.

Optionally, when the access mode of the target area is the Hybrid Access Mode and the type of the UE in the target area is determined, the source access NE transmits the information to the target access NE. The target access NE implements differentiated QoS control according to whether the UE is a CSG member. For example, the target access NE implements differentiated QoS control on the CSG member, that is, enables the CSG member to use network resources with higher priority, which can further enhance the user experience.

Note: Optionally, when the access mode of the target area is the Hybrid Access Mode, even if the allowed CSG list of the UE is not obtained, for example, the UE has no subscribed allowed CSG list information, the UE is ensured to be handed over to the target area, therefore ensuring service continuity of the UE and enhancing the user experience.

The handover control method under the present invention is not limited to the preceding decision ways in the handover decision process. Alternatively, the UE first obtains and determines the access mode of the target area; if the access mode of the target area is the Hybrid Access Mode, the UE selects the target area to initiate a handover procedure; if the access mode of the target area is the Closed Access Mode, the UE obtains information such as the CSG ID of the target area and the allowed CSG list of the UE, and determines whether the CSG ID of the target area is included in the allowed CSG list of the UE. If the CSG ID of the target area is included in the allowed CSG list of the UE, the UE selects the target area to initiate a handover procedure.

In addition, when the UE determines that the CSG ID of the target area is not included in the allowed CSG list of the UE, the UE obtains the access mode of the target area and determines which access mode the access mode of the target area is. If the access mode of the target area is the Hybrid Access Mode, the UE selects the target area to initiate a handover procedure; if the access mode of the target area is the Closed Access Mode, the UE does not select the target area to initiate a handover procedure.

Note: If the UE obtains the access mode and CSG ID of the target area, but obtains no allowed CSG list of the UE, for example, the UE has no subscription information of the CSG, the handover control method and the process of the UE determining whether the UE is a CSG member are similar to step 202 in way 1 of the second embodiment, and are not described here.

Figure 11:
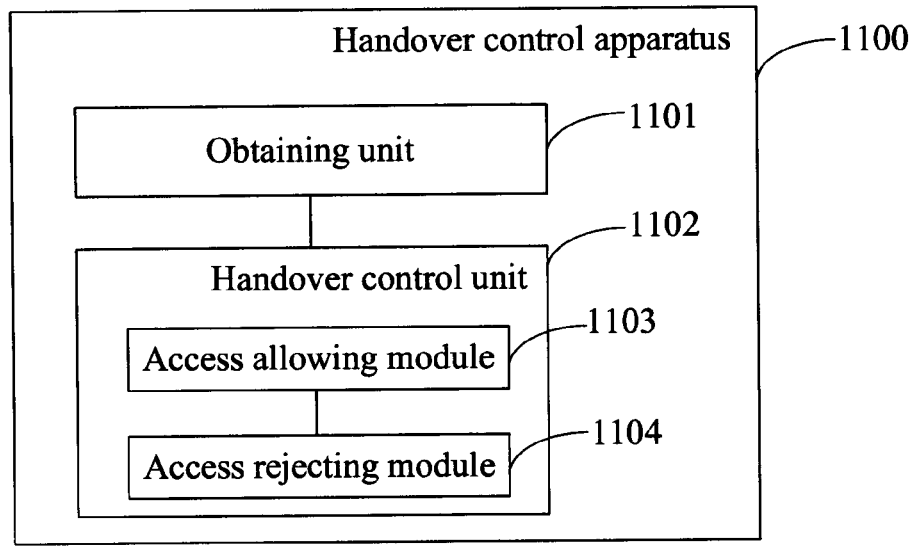
FIG. 11 shows a structure of a handover control apparatus according to an embodiment of the present invention.

Based on the preceding handover control method, an embodiment of the present invention further provides a handover control apparatus. As shown in FIG. 11, the handover control apparatus 1100 includes an obtaining unit 1101 and a handover control unit 1102.

The obtaining unit 1101 is configured to obtain the access mode and CSG ID of the target area and the allowed CSG list of the UE.

Note: The process of obtaining the allowed CSG list information is optional. If the UE has no subscribed allowed CSG list information, the allowed CSG list of the UE cannot be obtained.

The handover control unit 1102 is configured to control whether the UE can be handed over to the target area. Specifically, the handover control unit 1102 is configured to control whether the UE can be handed over to the target area:

if the access mode of the target area is the Hybrid Access Mode; or if the access mode of the target area is the Closed Access Mode, determine whether the CSG ID of the target area is included in the allowed CSG list of the UE, and if the CSG ID of the target area is included in the allowed CSG list of the UE; or if the CSG ID of the target area is not included in the allowed CSG list of the UE, determine the access mode of the target area, and if the access mode of the target area is the Hybrid Access Mode; or if the allowed CSG list of the UE does not exist, determine the access mode of the target area, and if the access mode of the target area is the Hybrid Access Mode;

the handover control unit 1102 allows the UE to be handed over to the target area.

The handover control unit 1102 further includes an access allowing module 1103 and an access rejecting module 1104.

If the access mode of the target area is the Hybrid Access Mode, the access allowing module 1103 is allowed to select the target area to initiate a handover procedure.

If the access mode of the target area is the Closed Access Mode, the handover control unit 1102 further determines whether the CSG ID of the target area is included in the allowed CSG list of the UE; if the CSG ID of the target area is included in the allowed CSG list of the UE, the access allowing module 1103 is allowed to select the target area to initiate a handover procedure; if the CSG ID of the target area is not included in the allowed CSG list of the UE, or if no allowed CSG list of the UE exists, the access rejecting module 1104 rejects initiating a handover procedure to the target area.

In addition, if the CSG ID of the target area is included in the allowed CSG list of the UE, and the UE is a CSG member in the target area, the access allowing module 1103 is allowed to select the target area to initiate a handover procedure.

If the CSG ID of the target area is not included in the allowed CSG list of the UE, or if no allowed CSG list of the UE exists, that is, the UE is a non-CSG member in the target area, the handover control unit 1102 further determines which access mode the access mode of the target area is; if the access mode of the target area is the Hybrid Access Mode, the access allowing module 1103 is allowed to select the target area to initiate a handover procedure; if the access mode of the target area is the Closed Access Mode, the access rejecting module 1104 rejects initiating a handover procedure to the target area.

The handover control apparatus 1100 in this embodiment may be a module that is built in or outside connected to an NE entity. The NE entity is a source access NE, a target access NE, a core management NE, a source core management NE, or a target core management NE. The physical position and structure of the handover control apparatus 1100 may have multiple forms and are not restricted.

The handover control apparatus provided in this embodiment uses the access mode of the target area as a factor for consideration in handover control, provides a processing mechanism to perform handover according to the access mode of the target area under the CSG mechanism, and ensures the handover of the UE to the target area that the UE is allowed to access, therefore ensuring service continuity of the UE and enhancing the user experience.

Optionally, when the access mode of the target area is the Hybrid Access Mode and the type of the UE in the target area is determined, the source access NE transmits the information to the target access NE. The target access NE implements differentiated QoS control according to whether the UE is a CSG member. For example, the target access NE implements differentiated QoS control on the CSG member, that is, enables the CSG member to use network resources with higher priority, which can further enhance the user experience.

Note: Optionally, when the access mode of the target area is the Hybrid Access Mode, even if the allowed CSG list of the UE is not obtained, for example, the UE has no subscribed allowed CSG list information, the UE is ensured to be handed over to the target area, therefore ensuring service continuity of the UE and enhancing the user experience.

Figure 12:
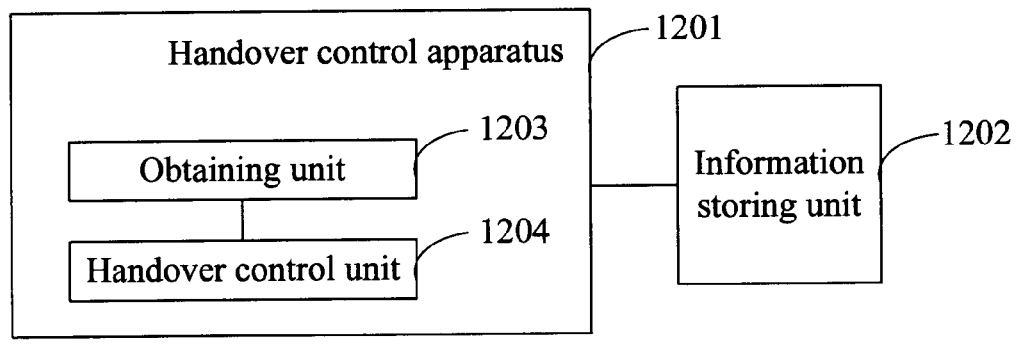
FIG. 12 shows a structure of a handover control system according to an embodiment of the present invention.

Based on the preceding handover control method, an embodiment of the present invention further provides a handover control system. As shown in FIG. 12, the handover control system includes a handover control apparatus 1201 and an information storing unit 1202.

The information storing unit 1202 is configured to: store information such as the access mode and CSG ID of the target area and the allowed CSG list of the UE, or generate a map of the information.

The handover control apparatus 1201 includes:

an obtaining unit 1203, configured to obtain the access mode and CSG ID of the target area and the allowed CSG list of the UE from the information storing unit 1202; and a handover control unit 1204.

if the access mode of the target area is the Hybrid Access Mode; or if the access mode of the target area is the Closed Access Mode, determine whether the CSG ID of the target area is included in the allowed CSG list of the UE, and if the CSG ID of the target area is included in the allowed CSG list of the UE; or if the CSG ID of the target area is not included in the allowed CSG list of the UE, determine the access mode of the target area, and if the access mode of the target area is the Hybrid Access Mode; if the allowed CSG list of the UE does not exist, determine the access mode of the target area, and if the access mode of the target area is the Hybrid Access Mode;

the handover control unit 1204 allows the UE to be handed over to the target area.

Figure 13:
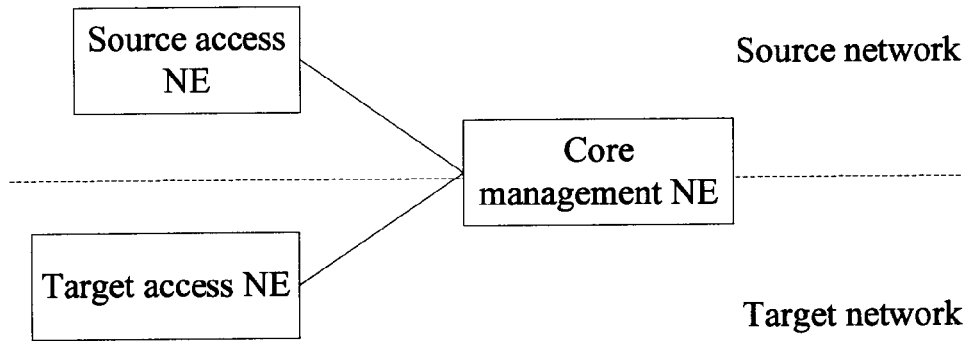
FIG. 13 shows a network structure of a handover control system according to an embodiment of the present invention.

As shown in FIG. 13, in the network architecture of the X2 interface, the handover control apparatus 1201 may be built in an NE entity such as the source access NE, target access NE, or core management NE.

Figure 14:
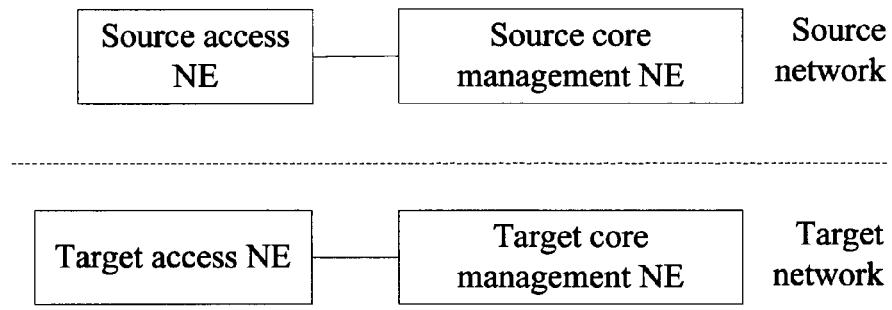
FIG. 14 shows another network structure of the handover control system according to an embodiment of the present invention.

As shown in FIG. 14, in the network architecture of the S1 interface, the handover control apparatus 1201 may be built in an NE entity such as the source access NE, target access NE, source core management NE, or target core management NE.

The handover control system in this embodiment uses the access mode of the target area as a factor for consideration in handover control, and ensures the handover of the UE to the target area that the UE is allowed to access, therefore ensuring service continuity of the UE and enhancing the user experience.

Optionally, when the access mode of the target area is the Hybrid Access Mode and the type of the UE in the target area is determined, the source access NE transmits the information to the target access NE. The target access NE implements differentiated QoS control according to whether the UE is a CSG member. For example, the target access NE implements differentiated QoS control on the CSG member, that is, enables the CSG member to use network resources with higher priority, which can further enhance the user experience.

Note: Optionally, when the access mode of the target area is the Hybrid Access Mode, even if the allowed CSG list of the UE is not obtained, for example, the UE has no subscribed allowed CSG list information, the UE is ensured to be handed over to the target area, therefore ensuring service continuity of the UE and enhancing the user experience.

Figure 15:
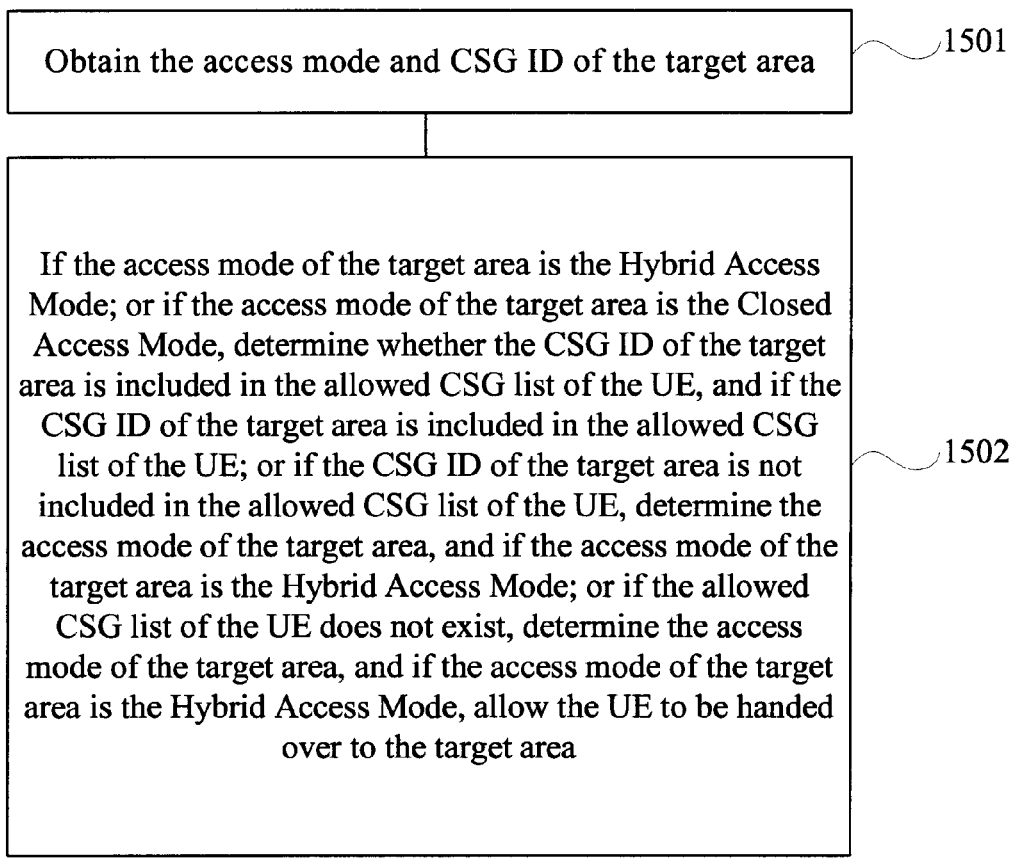
FIG. 15 is a flowchart of a handover control method according to an eighth embodiment of the present invention.

As shown in FIG. 15, a handover control method provided in the eighth embodiment includes the following steps:

Step 1501: Obtain the access mode and CSG ID of the target area.

Step 1502: If the access mode of the target area is the Hybrid Access Mode; or if the access mode of the target area is the Closed Access Mode, determine whether the CSG ID of the target area is included in the allowed CSG list of the UE, and if the CSG ID of the target area is included in the allowed CSG list of the UE; or if the CSG ID of the target area is not included in the allowed CSG list of the UE, determine the access mode of the target area, and if the access mode of the target area is the Hybrid Access Mode; or if the allowed CSG list of the UE does not exist, determine the access mode of the target area, and if the access mode of the target area is the Hybrid Access Mode;

allow the UE to be handed over to the target area.

The handover control method provided in the eighth embodiment of the present invention uses the access mode of the target area as a factor for consideration in handover control, provides a processing mechanism to perform handover according to the access mode of the target area under the CSG mechanism, and ensures the handover of the UE to the target area that the UE is allowed to access, therefore ensuring service continuity of the UE and enhancing the user experience.

Optionally, when the access mode of the target area is the Hybrid Access Mode, even if the allowed CSG list of the UE is not obtained, for example, the UE has no subscribed allowed CSG list information, the UE is ensured to be handed over to the target area, therefore ensuring service continuity of the UE and enhancing the user experience.

Figure 16:
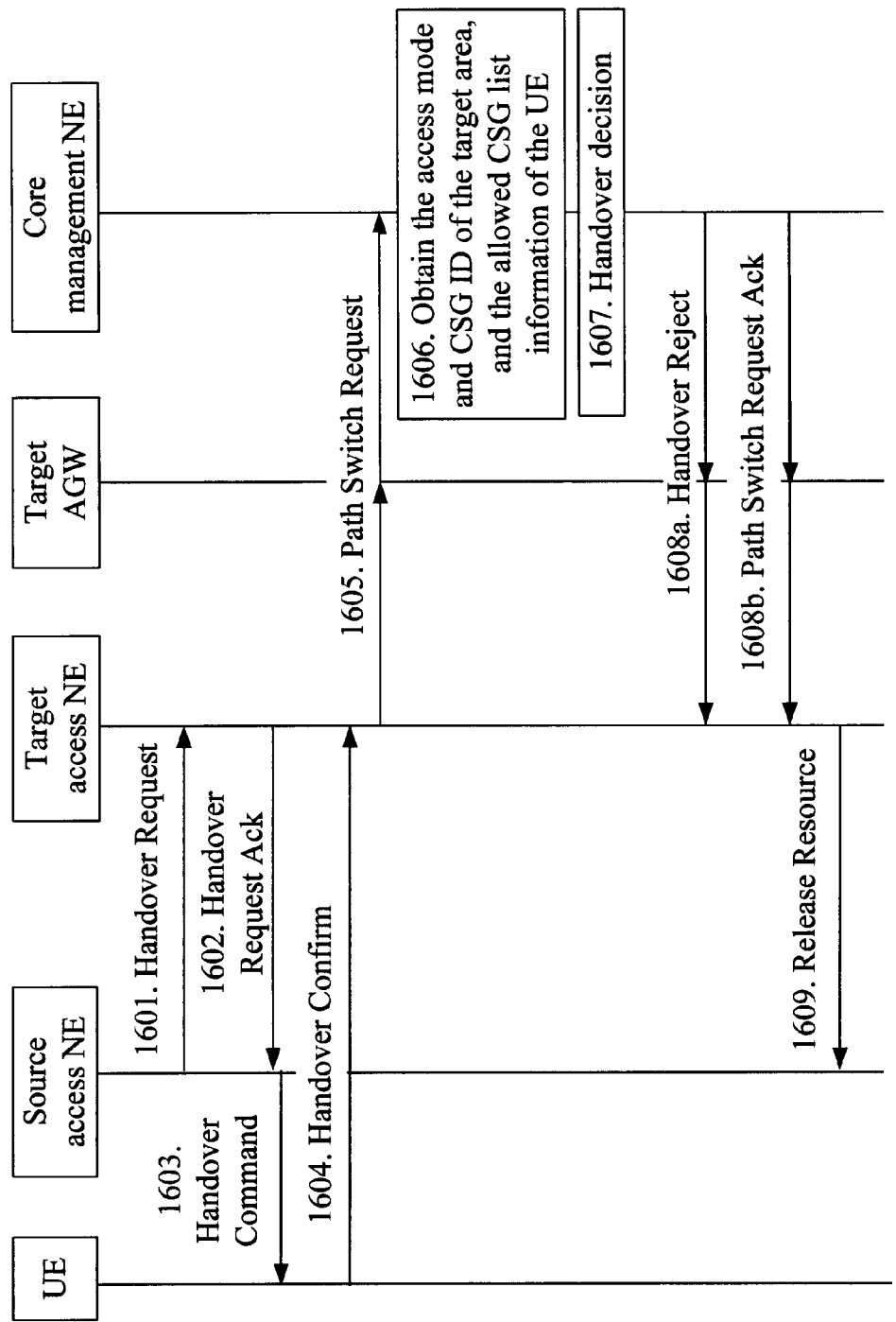
FIG. 16 is a signaling flowchart of a handover control method according to a ninth embodiment of the present invention.

In the handover control method of the ninth embodiment, the core management NE implements handover control during a handover. The ninth embodiment deals with X2-based handover. The source access NE and the target access NE can transmit a message to each other, and the core management NE remains unchanged, that is, the source core management NE and the target core management NE are a same core management NE. As shown in FIG. 16, the flowchart of the ninth embodiment includes the following steps:

Step 1601: The source access NE sends a Handover Request message to the target access NE.

The target access NE may be a home WAP (for example, an HNB, an HeNB, or a home non-3GPP WAP), a WAP with the CSG function (for example, a NodeB, an eNodeB, or a non-3GPP WAP), an HNB GW, an HeNB GW, or a home non-3GPP WAP GW.

Step 1602: The target access NE returns a Handover Request Ack message to the source access NE.

Optionally, the target access NE may carry the access mode and CSG ID information of the target area.

Step 1603: The source access NE sends a Handover Command message to the UE, notifying the UE to be handed over to the target area.

If the UE has subscribed allowed CSG list information, the UE can determine whether the CSG ID of the target area is included in the allowed CSG list of the UE; if the CSG ID of the target area is included in the allowed CSG list of the UE, the UE is a CSG member in the target area; if the CSG ID of the target area is not included in the allowed CSG list of the UE, the UE is a non-CSG member in the target area. The UE may obtain the access mode and CSG ID information of the target area with reference to step 205 in way 1 of the second embodiment.

If the UE has no subscribed allowed CSG list information, the UE is determined as a non-CSG member in the target area.

Step 1604: The UE hands over to the target area, and sends a Handover Confirm message to the target access NE.

The message may carry the information about whether the UE is a CSG member in the target area, so that the target access NE can perform special processing on the CSG member subsequently, for example, differentiated QoS control.

Step 1605: The target access NE sends a Path Switch Request message to the core management NE.

The target access NE may carry the access mode and CSG ID information of the target area in the message.

Step 1606: The core management NE obtains the access mode and CSG ID information of the target area.

The core management NE may obtain the access mode and CSG ID information of the target area in at least one of the following ways:

(1) The target access NE carries the access mode and CSG ID information of the target area in the Path Switch Request message.

(2) The core management NE is configured with a map between the target area and the access mode and between the target area and the CSG ID. The core management NE obtains the access mode and CSG ID information of the target area according to the map.

(3) The core management NE is configured with a map between the cell and the access mode and between the cell and the CSG ID. The target access NE carries cell information in the Path Switch Request message, and the core management NE obtains the access mode and CSG ID information of the target area according to the cell information.

(4) The HMS or the back-end system of the operator, for example, the OSS or BOSS of the operator, is configured with a map between the target area and the access mode and between the target area and the CSG ID. The core management NE queries the HMS or the back-end system of the operator for the access mode and CSG ID of the target area.

The core management NE may further obtain the allowed CSG list information of the UE, or know that no allowed CSG list information of the UE exists. For example, the core management NE obtains the allowed CSG list of the UE according to the following method: When the UE is registered with the core management NE, the core management NE sends an Update Location message to the HSS, and the HSS returns an Update Location Ack message to the core management NE. The HSS carries the allowed CSG list information of the UE in the message, and therefore the core management NE may obtain the allowed CSG list information of the UE. If the UE has no subscribed allowed CSG list information, and the HSS does not carry the allowed CSG list information of the UE in the Update Location Ack message, the core management NE obtains no allowed CSG list of the UE, that is, knows that the allowed CSG list information of the UE does not exist. Or when the HSS actively sends an Insert Subscriber Data message to the core management NE, and the subscription data stored in the HSS includes no allowed CSG list information of the UE, the HSS notifies the core management NE that the subscription information does not include the allowed CSG list of the UE, and therefore, the core management NE knows that no allowed CSG list information of the UE exists; or the core management NE may know that no allowed CSG list information of the UE exists according to the data reserved in the previous service processing of the UE.

If an AGW exists, the message is sent to the core management NE through the target AGW.

Step 1607: The core management NE decides whether to perform access and handover.

After obtaining the access mode and CSG ID of the target area, the core management NE decides whether to hand over to the target area according to the access mode and/or whether the CSG ID of the target area is included in the allowed CSG list of the UE. The core management NE may determine whether to initiate handover in the following ways:

The core management NE first determines the access mode of the target area. Specific determination steps are as follows:

(1) If the access mode of the target area is the Hybrid Access Mode, the core management NE selects the target area to initiate a handover procedure and executes the subsequent step 1608*b* regardless of whether the core management NE obtains allowed CSG list information of the UE or whether the CSG ID of the target area is included in the allowed CSG list of the UE.

If the core management NE obtains no allowed CSG list information of the UE, the core management NE may further determine the UE is a non-CSG member in the target area, so as to transmit the information that the UE is a non-CSG member to the target access NE.

If the core management NE obtains the allowed CSG list information of the UE, the core management NE determines whether the CSG ID of the target area is included in the allowed CSG list of the UE; if the CSG ID of the target area is included in the allowed CSG list of the UE, the UE is a CSG member in the target area; if the CSG ID of the target area is not included in the allowed CSG list of the UE, the UE is a non-CSG member in the target area, so that the information about whether the UE is a CSG member can be transmitted to the target access NE subsequently. Or (2) If the access mode of the target area is the Closed Access Mode, the core management NE determines whether the CSG ID of the target area is included in the allowed CSG list of the UE.

If the UE has no subscribed allowed CSG list information, the core management NE obtains no allowed CSG list of the UE, cannot select the target area to initiate a handover procedure, and executes the subsequent step 1608*a*.

If the UE has subscribed allowed CSG list information, the core management NE obtains the allowed CSG list of the UE; if the CSG ID of the target area is included in the allowed CSG list of the UE, the core management NE selects the target area to initiate a handover procedure and executes the subsequent step 1608*b*; if the CSG ID of the target area is not included in the allowed CSG list of the UE, the core management NE cannot select the target area to initiate a handover procedure and executes the subsequent step 1608*a*.

Another way is: The core management NE first determines whether the CSG ID of the target area is included in the allowed CSG list of the UE. Specific determination steps are as follows:

(1) If the UE has subscribed allowed CSG list information, the core management NE obtains the allowed CSG list of the UE:

1) If the CSG ID of the target area is included in the allowed CSG list of the UE, the UE is a CSG member in the target area, and the core management NE selects the target area to initiate a handover procedure and executes the subsequent step 1608*b*.

2) If the CSG ID of the target area is not included in the allowed CSG list of the UE, that is, the UE is a non-CSG member in the target area, the core management NE determines which access mode the access mode of the target area is. If the access mode of the target area is the Hybrid Access Mode, the core management NE selects the target area to initiate a handover procedure and executes the subsequent step 1608*b*; if the access mode of the target area is the Closed Access Mode, the core management NE cannot select the target area to initiate a handover procedure and executes the subsequent step 1608*a*.

(2) If the UE has no subscribed allowed CSG list information, that is, the core management NE obtains no allowed CSG list of the UE and the UE is a non-CSG member in the target area, the core management NE further determines which access mode the access mode of the target area is. If the access mode of the target area is the Hybrid Access Mode, the core management NE selects the target area to initiate a handover procedure and executes the subsequent step 1608*b*; if the access mode of the target area is the Closed Access Mode, the core management NE cannot select the target area to initiate a handover procedure and executes the subsequent step 1608*a*.

Step 1608*a*: The core management NE rejects access and handover.

If the core management NE rejects the Path Switch Request message of the target access NE, the core management NE sends a Handover Reject message to the target access NE. The Handover Reject message may carry an indication indicating that the rejection is caused by CSG access restricted (for example, the message carries the "Cause" value "CSG Access Restricted"), or the message carries the allowed CSG list information of the UE, and in this way, the source access NE does not select the target area for handover subsequently.

Step 1608*b*: The core management NE accepts access and handover.

If the core management NE accepts the Path Switch Request message of the target access NE, the core management NE returns a Path Switch Request Ack message to the target access NE, where the Path Switch Request Ack message may carry the information about whether the UE is a CSG member in the target area, so that the target access NE can perform special processing on the CSG member subsequently, for example, differentiated QoS control.

Step 1609: The target access NE sends a Release Resource message to the source access NE.

Up to now, the process of the core management NE deciding whether to initiate handover and making the UE to be handed over to the target area ends.

In the ninth embodiment, the source core management NE decides whether to hand over to the target area according to the access mode and/or whether the CSG ID of the target area is included in the allowed CSG list of the UE, and ensures the handover of the UE to the target area that the UE is allowed to access. Especially when the access mode of the target area is the Hybrid Access Mode, the UE is ensured to be handed over to the target area even if the UE has no subscribed allowed CSG list information and no allowed CSG list of the UE is obtained or the CSG ID of the target area is not included in the allowed CSG list of the UE, therefore ensuring service continuity of the UE and enhancing the user experience. Optionally, the access mode and CSG ID of the target area may be provided by the target access NE, which can reduce the modifications caused to the prior art by the source access NE obtaining the information. For example, the information is carried in the measurement report reported by the UE. Moreover, the information provided by the target access NE is more reliable.

Optionally, when the access mode of the target area is the Hybrid Access Mode and the type of the UE in the target area is determined, the source access NE transmits the information to the target access NE. The target access NE implements differentiated QoS control according to whether the UE is a CSG member. For example, the target access NE implements differentiated QoS control on the CSG member, that is, enables the CSG member to use network resources with higher priority, which can further enhance the user experience.

Accordingly, the embodiments of the present invention provide other handover control methods, and the handover control during a handover may be implemented by the source access NE, source core management NE, target core management NE, target access NE, and UE. For specific signaling procedures, see the descriptions in the second, fourth, fifth, sixth, and seventh embodiments. For specific obtaining and determining processes, see the description in the ninth embodiment.

The handover control method under the present invention decides whether to hand over to the target area according to the access mode and/or whether the CSG ID of the target area is included in the allowed CSG list of the UE, and ensures the handover of the UE to the target area that the UE is allowed to access. Especially when the access mode of the target area is the Hybrid Access Mode, the UE is ensured to be handed over to the target area even if the UE has no subscribed allowed CSG list information and no allowed CSG list of the UE is obtained or the CSG ID of the target area is not included in the allowed CSG list of the UE, therefore ensuring service continuity of the UE and enhancing the user experience. Optionally, when the access mode of the target area is the Hybrid Access Mode and the type of the UE in the target area is determined, the source access NE transmits the information to the target access NE. The target access NE implements differentiated QoS control according to whether the UE is a CSG member. For example, the target access NE implements differentiated QoS control on the CSG member, that is, enables the CSG member to use network resources with higher priority, which can further enhance the user experience.

Figure 17:
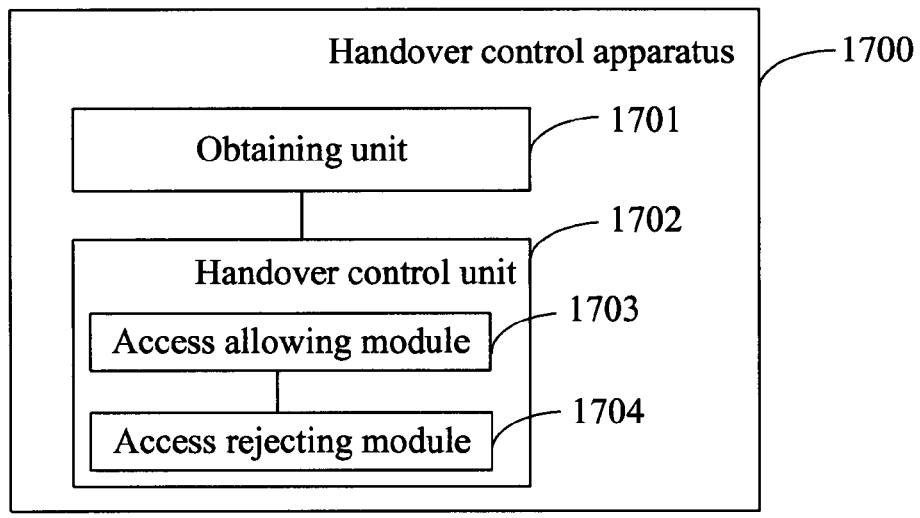
FIG. 17 shows a structure of a handover control apparatus according to an embodiment of the present invention.

Based on the preceding handover control method, an embodiment of the present invention further provides a handover control apparatus. As shown in FIG. 17, the handover control apparatus 1700 includes:

an obtaining unit 1701, configured to obtain the access mode and CSG ID of the target area; and a handover control unit 1702.

The handover control unit 1702 is configured to control whether the UE can be handed over to the target area:

if the access mode of the target area is the Hybrid Access Mode; or if the access mode of the target area is the Closed Access Mode, determine whether the CSG ID of the target area is included in the allowed CSG list of the UE, and if the CSG ID of the target area is included in the allowed CSG list of the UE; or if the CSG ID of the target area is not included in the allowed CSG list of the UE, determine the access mode of the target area, and if the access mode of the target area is the Hybrid Access Mode; or if the allowed CSG list of the UE does not exist, determine the access mode of the target area, and if the access mode of the target area is the Hybrid Access Mode;

the handover control unit 1702 allows the UE to be handed over to the target area.

The handover control unit 1702 further includes an access allowing module 1703 and an access rejecting module 1704.

If the access mode of the target area is the Hybrid Access Mode, the access allowing module 1703 is allowed to select the target area to initiate a handover procedure.

If the access mode of the target area is the Closed Access Mode, the handover control unit 1702 further determines whether the CSG ID of the target area is included in the allowed CSG list of the UE; if the CSG ID of the target area is included in the allowed CSG list of the UE, the access allowing module 1703 is allowed to select the target area to initiate a handover procedure; if the CSG ID of the target area is not included in the allowed CSG list of the UE, or if no allowed CSG list of the UE exists, the access rejecting module 1704 rejects initiating a handover procedure to the target area.

In addition, if the CSG ID of the target area is included in the allowed CSG list of the UE, the UE is a CSG member in the target area, and the access allowing module 1703 selects the target area to initiate a handover procedure.

If the CSG ID of the target area is not included in the allowed CSG list of the UE, or if no allowed CSG list of the UE exists, that is, the UE is a non-CSG member in the target area, the handover control unit 1702 further determines which access mode the access mode of the target area is; if the access mode of the target area is the Hybrid Access Mode, the access allowing module 1703 is allowed to select the target area to initiate a handover procedure; if the access mode of the target area is the Closed Access Mode, the access rejecting module 1704 rejects initiating a handover procedure to the target area.

The handover control apparatus 1700 in this embodiment may be built in or connected to an NE entity. The NE entity is a source access NE, a target access NE, a core management NE, a source core management NE, or a target core management NE. The physical position and structure of the handover control apparatus 1700 may have multiple forms and are not restricted.

The handover control apparatus provided in this embodiment uses the access mode of the target area as a factor for consideration in handover control, provides a processing mechanism to perform handover according to the access mode of the target area under the CSG mechanism, and ensures the handover of the UE to the target area that the UE is allowed to access, therefore ensuring service continuity of the UE and enhancing the user experience.

Optionally, when the access mode of the target area is the Hybrid Access Mode and the type of the UE in the target area is determined, the source access NE transmits the information to the target access NE. The target access NE implements differentiated QoS control according to whether the UE is a CSG member. For example, the target access NE implements differentiated QoS control on the CSG member, that is, enables the CSG member to use network resources with higher priority, which can further enhance the user experience.

Figure 18:
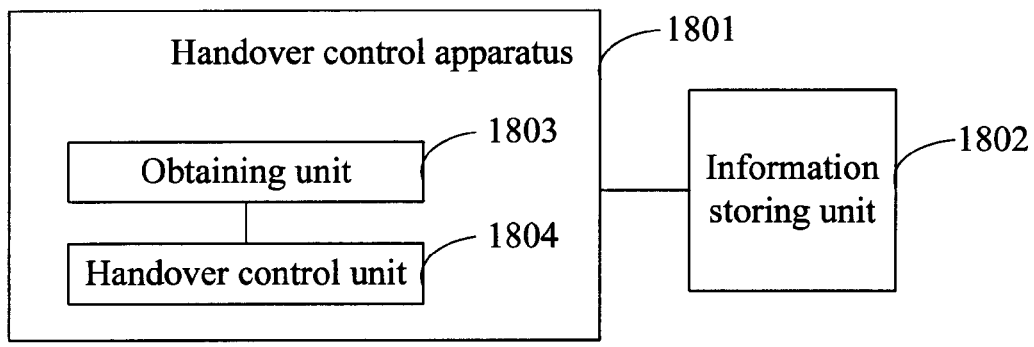
FIG. 18 shows a network structure of a handover control system according to an embodiment of the present invention.

Based on the preceding handover control method, an embodiment of the present invention further provides a handover control system. As shown in FIG. 18, the handover control system includes a handover control apparatus 1801 and an information storing unit 1802.

The information storing unit 1802 is configured to: store information such as the access mode and CSG ID of the target area and the allowed CSG list of the UE, or generate a map of the information. If the UE has no allowed CSG list information, the information storing unit 1802 stores no allowed CSG list information.

The handover control apparatus 1801 includes:

an obtaining unit 1803, configured to obtain the access mode and CSG ID of the target area from the information storing unit 1802; and a handover control unit 1804.

if the access mode of the target area is the Hybrid Access Mode; or if the access mode of the target area is the Closed Access Mode, determine whether the CSG ID of the target area is included in the allowed CSG list of the UE, and if the CSG ID of the target area is included in the allowed CSG list of the UE; or if the CSG ID of the target area is not included in the allowed CSG list of the UE, determine the access mode of the target area, and if the access mode of the target area is the Hybrid Access Mode; or if the allowed CSG list of the UE does not exist, determine the access mode of the target area, and if the access mode of the target area is the Hybrid Access Mode;

The handover control unit 1804 allows the UE to be handed over to the target area.

As shown in FIG. 13, in the network architecture of the X2 interface, the handover control apparatus 1801 may be built in an NE entity such as the source access NE, target access NE, or core management NE.

As shown in FIG. 14, in the network architecture of the S1 interface, the handover control apparatus 1801 may be built in an NE entity such as the source access NE, target access NE, source core management NE, or target core management NE.

The handover control system in this embodiment uses the access mode of the target area as a factor for consideration in handover control, and ensures the handover of the UE to the target area that the UE is allowed to access, therefore ensuring service continuity of the UE and enhancing the user experience.

Optionally, when the access mode of the target area is the Hybrid Access Mode and the type of the UE in the target area is determined, the source access NE transmits the information to the target access NE. The target access NE implements differentiated QoS control according to whether the UE is a CSG member. For example, the target access NE implements differentiated QoS control on the CSG member, that is, enables the CSG member to use network resources with higher priority, which can further enhance the user experience.

Although the present invention has been described through exemplary embodiments, the invention is not limited to such embodiments. It is apparent that those skilled in the art can make modifications and variations to the invention without departing from the spirit and scope of the invention. The invention is intended to cover the modifications and variations provided that they fall within the scope of protection defined by the claims or their equivalents.

What is claimed is:

1. A method for controlling a handover control for a User Equipment (UE), comprising:

initiating a handover procedure for a UE by a first Network Element (NE), the first NE being: a source access NE, a target access NE, a target Access Gateway, a source core management NE, or a target core management NE;

determining an access mode of a target area based on obtained information of an access mode and a closed subscriber group (CSG) identifier (ID) of the target area;

informing a target access NE whether the UE is a CSG member in the target area; and when the access mode of the target area is a Hybrid Access Mode, performing a handover of the UE to the target area before the UE is notified of being handed over to the target area.

2. The method according to claim 1, wherein the first NE is the source access NE and the method comprises:

receiving, by the source access NE, a measurement report reported by the UE, wherein the measurement report carries the access mode and CSG ID of the target area.

3. The method according to claim 1, wherein the first NE is the core management NE and the method comprises:

receiving, by the core management NE, a Path Switch Request message sent by the target access NE, wherein the Path Switch Request message carries the access mode and CSG ID of the target area.

4. The method according to claim 1, wherein the first NE is the source core management NE and the method comprises:

receiving, by the source core management NE, a Handover Required message sent by a source access NE, wherein the Handover Required message carries the access mode and CSG ID of the target area.

5. The method according to claim 1, wherein the first NE is a target core management NE and the method comprises:

receiving, by the target core management NE, a Handover Request Ack message sent by a target access NE, wherein the Handover Request Ack message carries the access mode and CSG ID of the target area; or receiving, by the target core management NE, a Forward Relocation Request message sent by a source core management NE, wherein the Forward Relocation Request message carries the access mode and CSG ID of the target area.

6. The method according to claim 1, wherein the first NE is a target access NE and the method comprises:

receiving, by the target access NE, a Handover Request message sent by a source access NE, wherein the Handover Request message carries the access mode and CSG ID of the target area; or receiving, by the target access NE, a Handover Request message sent by a target core management NE, wherein the Handover Request message carries the access mode and CSG ID of the target area.

7. The method according to claim 1, wherein the first NE is a source access NE, and the step of informing the target access NE, by the source access NE, whether the UE is a CSG member in the target area comprises:

sending, by the source access NE, a Handover Request message to the target access NE, wherein the Handover Request message carries the information about whether the UE is a CSG member; or sending, by the source access NE, a Handover Required message to a source core management NE; sending, by the source core management NE, a Forward Relocation Request message to a target core management NE; and sending, by the target core management NE, a Handover Request message to the target access NE, wherein the Handover Required message, the Forward Relocation Request message, and the Handover Request message all carry the information about whether the UE is a CSG member.

8. The method according to claim 1, wherein the first NE is the core management NE, and the step of informing the target access NE, by the core management NE, whether the UE is a CSG member to the target access NE comprises:

sending, by the core management NE, a Path Switch Request Ack message to the target access NE, wherein the Path Switch Request Ack message carries the information about whether the UE is a CSG member.

9. The method according to claim 1, wherein the first NE is the source core management NE, and the step of informing the target access NE, by the source core management NE, whether the UE is a CSG member to the target access NE comprises:

sending, by the source core management NE, a Forward Relocation Request message to a target core management NE; and sending, by the target core management NE, a Handover Request message to the target access NE, wherein the Forward Relocation Request message and the Handover Request message all carry the information about whether the UE is a CSG member.

10. The method according to claim 1, wherein the first NE is the source core management NE, and the step of informing the target access NE, by the source core management NE, whether the UE is a CSG member to the target access NE comprises:

sending, by the source core management NE, a Forward Relocation Request message to a target core management NE; and sending, by the target core management NE, a Handover Request message to the target access NE, wherein the Forward Relocation Request message and the Handover Request message all carry the information about whether the UE is a CSG member.

11. The method according to claim 1, wherein the first NE is the target core management NE, and the step of informing the target access NE, by the target core management NE, whether the UE is a CSG member to the target access NE comprises:

sending, by the target core management NE, a Handover Request message to the target access NE, wherein the Handover Request message carries the information about whether the UE is a CSG member.

12. A handover control apparatus, comprising:
an obtaining unit, configured to obtain an access mode and a closed subscriber group (CSG) identifier (ID) of a target area; and
a handover control unit, configured to: determine the access mode of the target area based on obtained information of access mode and CSG ID of the target area inform a access NE whether the UE is a CSG member in the target area, and when the access mode of the target area is a Hybrid Access Mode, perform the handover of the UE to the target area before the UE is notified of being handed over to the target area.

13. A system for controlling a handover for a User Equipment (UE), comprising:
a first Network Element (NE) and a target access NE, the first NE being: a source access NE, a target access NE, a target Access Gateway, a source core management NE, or a target core management NE;
the first NE being configured to initiate a handover procedure for a UE, determine an access mode of a target area based on obtained information of the access mode and a closed subscribe group (CSG) identifier (ID) of the target area, inform the target access NE whether the UE is a CSG member in the target area, and when the access mode of the target area is a Hybrid Access Mode, performing a handover of the UE to the target area;
the target access NE being configured to perform differentiated QoS control on the UE based on whether the UE is a CSG member or a non-CSG member before the UE is notified of being handed over to the target area.

* * * * *